(12) United States Patent  
Kato

(10) Patent No.: US 9,093,008 B2  
(45) Date of Patent: Jul. 28, 2015

(54) DISPLAY DEVICE AND METHOD FOR DRIVING DISPLAY DEVICE

(75) Inventor: Toshiyuki Kato, Osaka (JP)

(73) Assignee: JOLED INC., Tokyo (JP)

( * ) Notice: Subject to any disclaimer, the term of this patent is extended or adjusted under 35 U.S.C. 154(b) by 139 days.

(21) Appl. No.: 13/604,171

(22) Filed: Sep. 5, 2012

(65) Prior Publication Data

US 2013/0027382 A1    Jan. 31, 2013

Related U.S. Application Data

(63) Continuation of application No. PCT/JP2011/004175, filed on Jul. 25, 2011.

(51) Int. Cl.
*G09G 3/38* (2006.01)
*G09G 3/00* (2006.01)
*H04N 13/04* (2006.01)
*G09G 3/32* (2006.01)

(52) U.S. Cl.
CPC .............. *G09G 3/003* (2013.01); *G09G 3/3233* (2013.01); *G09G 3/3266* (2013.01); *H04N 13/0438* (2013.01); *G09G 2300/0852* (2013.01); *G09G 2300/0861* (2013.01)

(58) Field of Classification Search
CPC .................................. G02F 1/133; G09G 3/38
USPC .................................................. 345/204–215
See application file for complete search history.

(56) References Cited

U.S. PATENT DOCUMENTS

| 4,772,943 | A | 9/1988 | Nakagawa et al. |
| 4,870,486 | A | 9/1989 | Nakagawa et al. |
| 6,998,775 | B2 | 2/2006 | Sugiura et al. |
| 7,342,246 | B2 | 3/2008 | Sugiura et al. |
| 7,741,771 | B2 | 6/2010 | Sugiura et al. |
| 2004/0012980 | A1 | 1/2004 | Sugiura et al. |
| 2005/0161693 | A1 | 7/2005 | Sugiura et al. |
| 2006/0170625 | A1* | 8/2006 | Kim .............................. 345/76 |
| 2009/0021137 | A1 | 1/2009 | Sugiura et al. |

(Continued)

FOREIGN PATENT DOCUMENTS

| JP | 63-046410 | 2/1988 |
| JP | 2003-036969 | 2/2003 |

(Continued)

OTHER PUBLICATIONS

International Search Report in PCT/JP2011/004175, dated Oct. 18, 2011.

*Primary Examiner* — Kent Chang  
*Assistant Examiner* — Mark Edwards  
(74) *Attorney, Agent, or Firm* — Greenblum & Bernstein P.L.C.

(57) ABSTRACT

A display device includes: a driver including: a scanning line driver; and a signal line driver, in the pixels, a quenched state sequentially starts, for each row, in the rows of the pixels, based on the first pulse of the scanning signal that is input through the scanning line, and light-emission data from the signal line is written on the row of the pixels, based on the second pulse of the scanning signal, the driver supplies the scanning signal and the image signal to the scanning line and the signal line, respectively, such that writing the light-emission data on a first row of the pixels starts before a start of the quenched state in a last row of the pixels, and such that writing the light-emission data on the last row of the pixels ends after a start of a light-emission state in the first row of the pixels starts.

11 Claims, 16 Drawing Sheets

(56) References Cited

U.S. PATENT DOCUMENTS

| | | |
|---|---|---|
| 2010/0007645 A1* | 1/2010 | Ono .............................. 345/211 |
| 2010/0033461 A1* | 2/2010 | Hasegawa et al. ............ 345/211 |
| 2011/0032342 A1 | 2/2011 | Kato et al. |
| 2011/0090320 A1 | 4/2011 | Tsuchida |
| 2012/0050350 A1 | 3/2012 | Matsui |

FOREIGN PATENT DOCUMENTS

| | | |
|---|---|---|
| JP | 2010-039398 | 2/2010 |
| WO | 2010/082479 | 7/2010 |

\* cited by examiner

DISPLAY DEVICE AND METHOD FOR DRIVING DISPLAY DEVICE

CROSS REFERENCE TO RELATED APPLICATIONS

This is a continuation application of PCT Patent Application No. PCT/JP2011/004175 filed on Jul. 25, 2011, designating the United States of America. The entire disclosures of the above-identified application, including the specification, drawings and claims are incorporated herein by reference in their entirety.

TECHNICAL FIELD

One or more exemplary embodiments disclosed herein relate generally to a video display system, a video display method, and a display device configured suitably for displaying stereoscopic images.

BACKGROUND ART

Various methods for displaying stereoscopic video have been considered. As an example, there is a method in which image information for one eye and image information for the other eye corresponding to disparity for a user to recognize a stereoscopic video are alternately displayed, and the stereoscopic video is generated by switching shutters in glasses having electric shutters (for example, see the patent literature 1).

With this method, the video signal of the stereoscopic video in one screen is separated into a first frame in which the image information for the one eye is set and a second frame in which the image information for other eye is set. By the holding type display method in which luminance of a previous image is held until a next input of writing signal to the display unit, the image information for the first frame and the image information for the second frame are alternately displayed on the display unit. The viewer can recognize a stereoscopic video for one frame through the glasses having electric shutters on the left and on the right opening and closing in synchronization with the first frame and the second frame.

In addition, with the display method, a black display period is provided between a display period of the video signal for the first frame and a display period of the video signal for the second frame, such that the viewer does not confuse the video in the first frame and the video in the second frame.

CITATION LIST

Patent Literature

[Patent Literature 1] WO2010-082479

SUMMARY OF INVENTION

Technical Problem

FIG. 15 illustrates an example of the scanning timing for displaying image in the display device illustrated in the patent literature 1. In FIG. 15, (a) illustrates the timing for scanning, (b) illustrates timing for a right-eye shutter in the glasses having the shutters, and (c) illustrates the timing for a left-eye shutter in the glasses having the shutters.

In the image display device disclosed in the patent literature 1, switching of shutters in the glasses having the shutters start at the first time $t_1$ as illustrated in (b) and (c) in FIG. 15, and scanning for writing the display data is performed on all of the display lines from the first time $t_1$ to the third time $t_3$, as illustrated in FIG. 15 (a). All of the display lines emit light simultaneously at the third time $t_3$. At the fourth time $t_4$, all of the display lines stop emitting light and the shutter switching and the scan for writing the display data begin.

With this signal control, the image display device disclosed in the patent literature 1 can start emitting light in all of the display lines at the same time as the timing at which the writing scan of a display line at which the last writing scan is performed (1080th line) is finished.

However, in the image display device illustrated in FIG. 15, driving for making a display image as bright as possible by a general gate driver is performed by simultaneously causing light-emission on the entire screen, and simultaneously quenching the entire screen. Consequently, with the display method illustrated in FIG. 15 in which the entire screen emits light at the same time, there is a problem of increased load on the power source circuit. In addition, there is another problem that the display is relatively dark, since the light-emission cannot be performed until the writing on all of the lines is finished.

One non-limiting and exemplary embodiment provides a display device capable of displaying a bright, high image quality 3D video.

Solution to Problem

In one general aspect, the display device disclosed here feature a plurality of pixels disposed in rows and columns; a scanning line provided for each of the rows of the pixels; a signal line provided for each of the columns of the pixels; and a driver including: a scanning line driver which drives the scanning line; and a signal line driver which drives the signal line, in which the scanning line driver which outputs a scanning signal and a second pulse, the signal line driver outputs an image signal corresponding to the right-eye image and an image signal corresponding to the left-eye image, in the pixels, a quenched state sequentially starts, for each row, in the rows of the pixels, based on the first pulse of the scanning signal that is input through the scanning line, and light-emission data from the signal line is written on the row of the pixels, based on the second pulse of the scanning signal, the driver supplies the scanning signal and the image signal to the scanning line and the signal line, respectively, such that writing the light-emission data on a first row of the pixels starts before a start of the quenched state in a last row of the pixels, and such that writing the light-emission data on the last row of the pixels ends after a start of a light-emission state in the first row of the pixels starts.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects of Invention

One or more exemplary embodiments or features disclosed herein provide a display device capable of displaying bright, high-image quality 3D video.

BRIEF DESCRIPTION OF DRAWINGS

These and other advantages and features will become apparent from the following description thereof taken in conjunction with the accompanying Drawings, by way of non-limiting examples of embodiments of the present disclosure.

In FIG. 15, (a) illustrates the timing for scanning, (b) illustrates timing for the right-eye shutter in the glasses having the shutters, and (c) illustrates the timing for the left-eye shutter in the glasses having the shutters.

DESCRIPTION OF EMBODIMENTS

Figure 1:
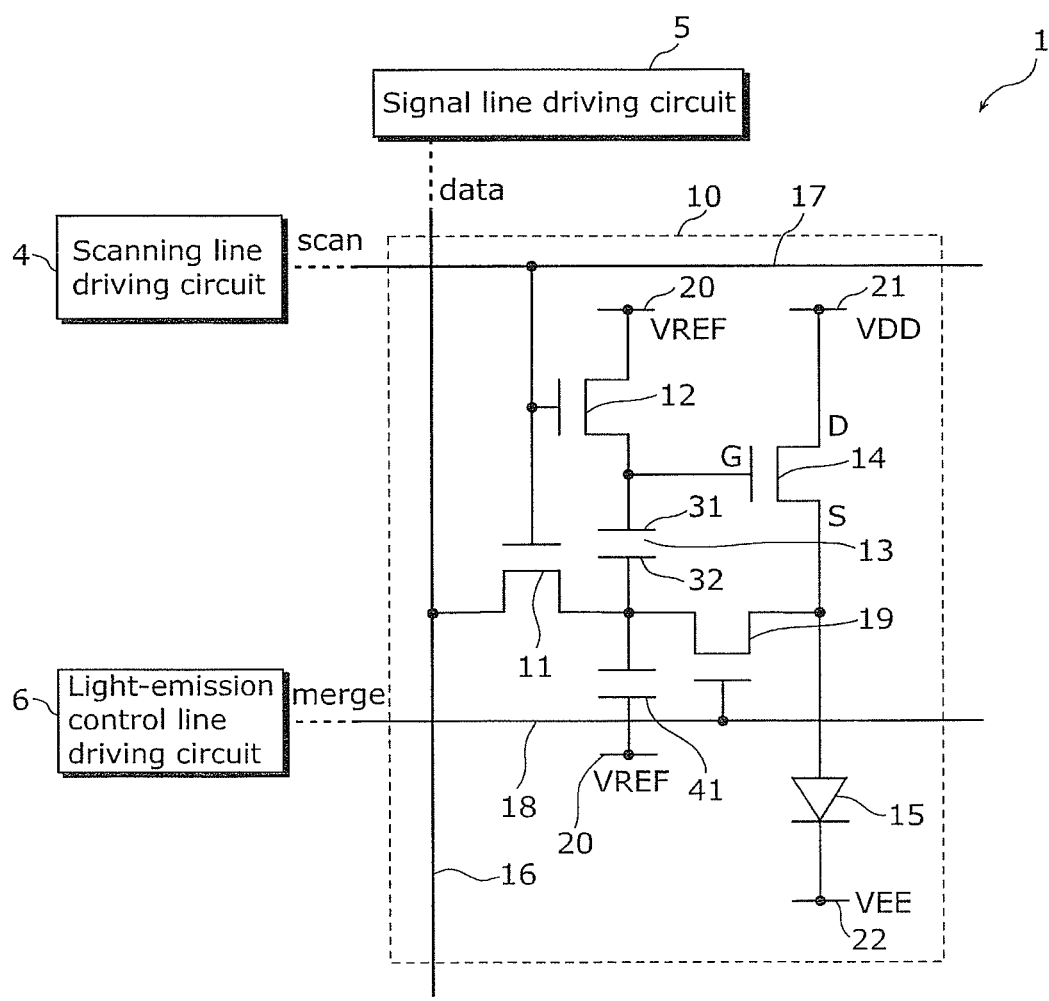
FIG. 1 illustrates a configuration of a circuit in a pixel included in the display device according to the embodiment 1.

The display device according to an aspect of the present disclosure includes a plurality of pixels disposed in rows and columns; a scanning line provided for each of the rows of the pixels; a signal line provided for each of the columns of the pixels; and a driver including: a scanning line driver which drives the scanning line; and a signal line driver which drives the signal line, in which the scanning line driver which outputs a scanning signal and a second pulse, the signal line driver outputs an image signal corresponding to the right-eye image and an image signal corresponding to the left-eye image, in the pixels, a quenched state sequentially starts, for each row, in the rows of the pixels, based on the first pulse of the scanning signal that is input through the scanning line, and light-emission data from the signal line is written on the row of the pixels, based on the second pulse of the scanning signal, the driver supplies the scanning signal and the image signal to the scanning line and the signal line, respectively, such that writing the light-emission data on a first row of the pixels starts before a start of the quenched state in a last row of the pixels, and such that writing the light-emission data on the last row of the pixels ends after a start of a light-emission state in the first row of the pixels starts.

According to the present disclosure, writing the data on the quenched pixel can be started before the quenching of all of the pixels is complete, and the light-emission of the pixels on which the data is written can be started before writing the data on all of the pixels is complete. With this, it is possible to secure a long light-emission period on the display unit of the display device, and can secure high display luminance without increasing the driving cycle in the stereoscopic display.

Furthermore, the display device according to an aspect of the present disclosure includes a plurality of pixels disposed in rows and columns; a scanning line provided for each of the rows of the pixels; a signal line provided for each of the columns of the pixels; and a driver including: a scanning line driver which drives the scanning line; and a signal line driver which drives the signal line, in which the scanning line driver which outputs a scanning signal and a second pulse, the signal line driver outputs an image signal corresponding to the right-eye image and an image signal corresponding to the left-eye image, in the pixels, light-emission data from the signal line is written, for each row, in the rows of the pixels, based on the first pulse of the scanning signal that is input through the scanning line, and light-emission state starts, on the row of the pixels, based on the second pulse of the scanning signal, the driver supplies the scanning signal and the image signal to the scanning line and the signal line, respectively, such that writing the light-emission data on a first row of the pixels starts before a start of the quenched state in a last row of the pixels, and such that writing the light-emission data ends after a start of a light-emission state in the first row of the pixels starts.

According to the present disclosure, writing the data on the quenched pixel can be started before the quenching of all of the pixels is complete, and the light-emission of the pixels on which the data is written can be started before writing the data on all of the pixels is complete. With this, it is possible to secure a long light-emission period on the display unit of the display device, and can secure high display luminance without increasing the driving cycle in the stereoscopic display.

Furthermore, the display device according to an aspect of the present disclosure includes the scanning line driver includes: a first shift register which sequentially outputs a first signal, based on a clock signal having a first cycle; a second shift register which sequentially outputs a second signal, based on a clock signal having a second cycle different from the first cycle; and a logic circuit which calculates a logical disjunction or a logical conjunction of the first signal and the second signal that are input, and outputs a scanning signal which includes a first pulse based on the first signal and a second pulse based on the second signal.

With this, the pulse signals of different cycles can be output to the scanning line as the scanning signal. Accordingly, the light-emission on the pixel on which the data is written can be started before the writing on all of the pixels is complete. With this, it is possible to secure a long light-emission period on the display unit of the display device, and can secure high display luminance without increasing the driving cycle in the stereoscopic display.

Furthermore, in the display device according to an aspect of the present disclosure, the second cycle is longer than the first cycle.

Furthermore, in the display device according to an aspect of the present disclosure, the first cycle is longer than the second cycle.

With this, it is possible to display the video of high luminance while maintaining the writing speed of the video signal. With this, the bright, high-image quality 3D video can be displayed.

Furthermore, the display device according to an aspect of the present disclosure includes each of the pixels includes at least: a light-emitting element; a first capacitor which holds voltage; a driving transistor which provides the light-emitting element with flow of a drain current or source current according to the voltage held by the first capacitor, causing the light-emitting element to emit light; a first switching transistor which switches conduction and non-conduction between a first reference potential line which supplies a predetermined reference potential and a gate electrode of the driving transistor; a second switching transistor which switches conduction and non-conduction between the signal line and the first capacitor; and a third switching transistor which switches conduction and non-conduction between the first capacitor and a source electrode of the driving transistor, the display device further includes: a first power source line and a second power source line for supplying power to the pixels; and a control line for supplying a control signal to the third switching transistor.

With this, the scanning line driving circuit having the features described above can be implemented.

Furthermore, the display device according to an aspect of the present disclosure includes in the pixel, one of electrodes of the light-emitting element is connected to the second power source line, and the other of the electrodes of the light-emitting element is connected to a source electrode of the driving transistor, a drain electrode of the driving transistor is connected to the first power source line, one of electrodes of the first capacitor is connected to the gate electrode of the driving transistor, the other of the electrodes of the first capacitor is connected to a drain electrode or a source electrode of the second switching transistor, a gate electrode of the first switching transistor is connected to the scanning line, a gate electrode of the second switching transistor is connected to the scanning line, a gate electrode of the third switching transistor is connected to the control line, and the pixel further includes a second capacitor having one electrode connected to the one of the electrodes of the first capacitor, and the other electrode connected to a second reference potential line for supplying the predetermined reference potential.

With this, the scanning line driving circuit capable of outputting the pulse signals of different cycles to the pixels by the n-type transistor can be implemented.

Furthermore, in the display device according to an aspect of the present disclosure, the first switching transistor and the second switching transistor are n-type thin-film transistors, and the logic circuit is a circuit which calculates the logical disjunction of the first signal and the second signal.

Furthermore, the display device according to an aspect of the present disclosure includes the driver which sets the first switching transistor in a conduction state by the first pulse of the scanning signal and the driving transistor in a non-conduction state by the predetermined reference potential supplied to the gate electrode of the driving transistor, such that the light-emitting element is in the quenched state, sets the second switching transistor in a conduction state by the second pulse of the scanning signal, such that the light-emission data from the signal line is written on the first capacitor, and sets the third switching transistor in a conduction state by a control signal supplied from the control line, such that a voltage corresponding to the light-emission data written on the first capacitor is applied between the gate electrode and the source electrode of the driving transistor, causing the light-emitting element to be in the light-emission state.

Furthermore, in the display device according to an aspect of the present disclosure, in the pixel, one of electrodes of the light-emitting element is connected to the second power source line, and the other of the electrodes of the light-emitting element is connected to a drain electrode of the driving transistor, a source electrode of the driving transistor is connected to the first power source line, one of electrodes of the first capacitor is connected to the gate electrode of the driving transistor, the other of the electrodes of the first capacitor is connected to a drain electrode or a source electrode of the second switching transistor, a gate electrode of the first switching transistor is connected to the scanning line, a gate electrode of the second switching transistor is connected to the scanning line, a gate electrode of the third switching transistor is connected to the control line, and the pixel further includes a second capacitor having one electrode connected to the one of the electrodes of the first capacitor, and the other electrode connected to a second reference potential line for supplying the predetermined reference potential.

With this, the scanning line driving circuit capable of outputting the pulse signals of different cycles to the pixels by the p-type transistor.

Furthermore, in the display device according to an aspect of the present disclosure, the first switching transistor and the second switching transistor are p-type thin-film transistors, and the logic circuit calculates the logical conjunction of the first signal and the second signal.

Furthermore, in the display device according to an aspect of the present disclosure, the driver sets the first switching transistor in a conduction state by the first pulse of the scanning signal and the driving transistor in a non-conduction state by the predetermined reference potential supplied to the gate electrode of the driving transistor, such that the light-emitting element is in the quenched state, sets the second switching transistor in a conduction state by the second pulse of the scanning signal, such that the light-emission data from the signal line is written on the first capacitor, and sets the third switching transistor in a conduction state by a control signal supplied from the control line, such that a voltage corresponding to the light-emission data written on the first capacitor is applied between the gate electrode and the source electrode of the driving transistor, causing the light-emitting element to be in the light-emission state.

Furthermore, in the display device according to an aspect of the present disclosure, the driver starts the light-emission state of the first row of the pixels after the start of the quenched state of the last row of the pixels.

With this, a period in which all of the pixels are in the quenched state can be provided.

Furthermore, a method of driving the display device, according to an aspect of the present disclosure includes a plurality of pixels disposed in rows and columns; a scanning line provided for each of the rows of the pixels; and a signal line provided for each of the columns of the pixels, and in the scanning line and the signal line, at least one of (i) a time from a start of a light-emission state of the first row of the pixels to a start of the light-emission state of the last row of the pixels and (ii) a time from a start of a quenched state of the first row of the pixels to a start of quenched state of the last row of the pixels is shorter than a time from a start of writing the light-emission data on the first row of the pixels to an end of writing the light-emission data on the last row of the pixels, and the scanning signal and the image signal are supplied to the scanning line and the signal line, respectively, such that writing the light-emission data on a first row of the pixels starts before a start of the quenched state in a last row of the pixels, and such that writing the light-emission data ends after a start of a light-emission state in the first row of the pixels starts.

According to the present disclosure, writing the data on the quenched pixel can be started before the quenching of all of the pixels is complete, and the light-emission of the pixels on which the data is written can be started before writing the data on all of the pixels is complete. With this, it is possible to secure a long light-emission period on the display unit of the display device, and can secure high display luminance without increasing the driving cycle in the stereoscopic display.

The following shall describe exemplary embodiment of the present disclosure with reference to the drawings. Note that, the same reference numerals shall be assigned to identical or equivalent elements in all of the drawings, and overlapping description shall be omitted.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the inventive concept, the scope of which is defined in the appended Claims and their equivalents. Therefore, among the structural elements in the following exemplary embodiments, structural elements not recited in any one of the independent claims defining the most generic part of the inventive concept are described as arbitrary structural elements.

Embodiment 1

A display device according to the embodiment 1 includes a plurality of pixels disposed in rows and columns; a scanning line provided for each of the rows of the pixels; a signal line provided for each of the columns of the pixels; and a driver including: a scanning line driver which drives the scanning line; and a signal line driver which drives the signal line, wherein the scanning line driver includes: a first shift register which sequentially outputs a first signal, based on a clock signal having a first cycle; a second shift register which sequentially outputs a second signal, based on a clock signal having a second cycle different from the first cycle; and a logic circuit which calculates a logical disjunction or a logical conjunction of the first signal and the second signal that are input, and outputs a scanning signal which includes a first pulse based on the first signal and a second pulse based on the second signal, the signal line driver outputs an image signal corresponding to the right-eye image and an image signal corresponding to the left-eye image, in the pixels, a quenched state sequentially starts, for each row, in the rows of the pixels, based on the first pulse of the scanning signal that is input through the scanning line, and light-emission data from the signal line is written on the row of the pixels, based on the second pulse of the scanning signal, the driver supplies the scanning signal and the image signal to the scanning line and the signal line, respectively, such that writing the light-emission data on a first row of the pixels starts before a start of the quenched state in a last row of the pixels, and such that writing the light-emission data on the last row of the pixels ends after a start of a light-emission state in the first row of the pixels starts. With this, the display device according to the embodiment 1 can secure high display luminance without increasing the speed of writing the light-emission data in a stereoscopic display.

Hereinafter, the embodiment 1 of the present disclosure shall be specifically described with reference to the drawings.

FIG. 1 is a diagram illustrating a circuit configuration of a pixel and connection with peripheral circuits in the display device according to the embodiment 1.

As illustrated in FIG. 1, the display device 1 according to the embodiment 1 includes a display unit having multiple pixels 10. The display device 1 further includes, as the peripheral circuits of the display unit, a scanning line driving circuit 4, a signal line driving circuit 5, a light-emission control line driving circuit 6, and a control circuit (not illustrated) for controlling the scanning line driving circuit 4, the signal line driving circuit 5, and the light-emission control line driving circuit 6.

The display unit including the pixels 10 displays an image based on the input of video signal input to the display device 1 from outside.

The pixel 10 includes a switching transistor 11, switching transistors 12 and 19, capacitors 13 and 41, a driving transistor 14, an organic EL element 15, a signal line 16, a scanning line 17, a control line 18, a reference power source line 20, a positive power source line 21, and a negative power source line 22.

Here, the switching transistor 12, the switching transistor 11, and the switching transistor 19 correspond to the first switching transistor, the second transistor, and the third transistor according to the disclosure, respectively. Furthermore, the capacitors 13 and 41 correspond to the first capacitor and the second capacitor according to the embodiment, respectively.

The scanning line driving circuit 4 is the scanning line driver according to the disclosure, and is a gate driver including two shift registers 50 and 51 to be described later. The scanning line driving circuit 4 is connected to the scanning line 17, and is a driving circuit capable of controlling conduction and non-conduction of the switching transistor 11 and the switching transistor 12 in the pixel 10 by outputting scanning signals to the scanning line 17.

The signal line driving circuit 5 is the signal line driver according to the disclosure, and is a driving circuit connected to the signal line 16, and capable of outputting image signals corresponding to a right eye image and a left eye image to the pixel 10.

The light-emission control line driving circuit 6 is configured of a general gate driver. The light-emission line driving circuit 6 is connected to the control line 18, and is a driving circuit capable of controlling conduction and non-conduction of the switching transistor 19 included in the pixel 10 by outputting the scanning signals to the control line 18.

Note that, the control circuit which is not illustrated is a general control circuit capable of controlling the scanning line driving circuit 4, the signal line driving circuit 5, and the light-emission control line driving circuit 6. The control circuit includes a memory (not illustrated) in which correction data for each pixel and others are stored, reads the correction data written on the memory, corrects the video signal input from outside based on the correction data, and outputs the corrected video signal to the signal line driving circuit 5.

Furthermore, although not illustrated in FIG. 1, the positive power source line 21, the negative power source line 22, and the reference power source line 20 are commonly connected to all of the pixels, and are connected to the power source line driving circuit. When a voltage obtained by adding a threshold voltage of the driving transistor 14 to a light-emission starting voltage of the organic EL element 15 is greater than 0 V, the voltage at the reference power source line 20 may be identical to the negative power source line 22. This reduces the types of voltage provided from the power source line driving circuit, making the circuit configuration simpler.

The following shall describe connections and function of the components of the pixel 10.

The switching transistor 11 is the second switching transistor, and has a gate connected to the scanning line 17, one of a source and a drain connected to the signal line 16 which is the data line, and the other of the source and the drain is connected to the electrode 32 which is a second electrode of the capacitor 13. The switching transistor 11 is capable of determining timing for applying the signal voltage at the signal line 16 to an electrode 32 in the capacitor 13.

The switching transistor 12 is the first switching transistor, and has a gate connected to the scanning line 17, one of a source and a drain is connected to the reference power source line 20, and the other of the source and the drain is connected to the electrode 31 which is a first electrode of the capacitor 13. The switching transistor 12 is capable of determining timing for applying a reference voltage VREF of the reference power source line 20 to the electrode 31 of the capacitor 13. The switching transistor 11 and the switching transistor 12 are, for example, configured of n-type thin film transistors (n-type TFT).

The capacitor 13 is a capacitor having an electrode 31, which is the first electrode connected to the gate of the driving transistor 14, and an electrode 32, which is the second electrode connected to the source of the driving transistor 14 through the switching transistor 19. The capacitor 13 is capable of stabilizing current supply from the driving transistor 14 to the organic EL element 15 by holding voltage corresponding to the signal voltage supplied from the signal line 16, and for example, stably holding a gate-source potential in the driving transistor 14 after the switching transistor 11 and the switching transistor 12 are switched off.

The driving transistor 14 is a driving element having a drain connected to the positive power source line 21, which is the first power source line, and a source connected to an anode of the organic EL element 15. The driving transistor 14 converts a voltage corresponding to the signal voltage applied between the gate and source into a drain current corresponding to the signal voltage. Subsequently, the driving transistor 14 supplies the drain current to the organic EL element 15 as the signal current. The driving transistor 14 is composed of, for example, an n-type thin-film transistor (n-type TFT).

The organic EL element 15 is a light-emitting element having a cathode connected to the negative power source line 22 which is the second power source line, and emits light when a flow of current is provided from the driving transistor 14.

The switching transistor 19 is the third switching transistor having a gate connected to the control line 18, one of the source and the drain is connected to the source of the driving transistor 14, and the other of the source and the drain is connected to the electrode 32 in the capacitor 13. The switching transistor 19 is capable of determining timing for applying, between the gate and source of the driving transistor 14, the potential held by the capacitor 13. The driving transistor 19 is composed of, for example, an n-type thin-film transistor (n-type TFT).

The capacitor 41 is the second capacitor connected between the electrode 32 which is the second electrode of the capacitor 13 and the reference power source line 20. First, the capacitor 41 stores the source potential of the driving transistor 14 in steady state with the switching transistor 19 conducted. Subsequently, even if the switching transistor 19 is switched off, the potential in the electrode 32 of the capacitor 13 is set, thereby setting the gate voltage of the driving transistor 14. In contrast, the source potential of the driving transistor 14 is always in the steady state. As a result, the capacitor 41 is capable of stabilizing the gate-source voltage of the driving transistor 14.

Note that, the capacitor 41 may be connected to a reference power source line different from the reference power source line 20 by connecting one of the source and the drain of the switching transistor 12. For example, the reference power source line may be the positive power source line VDD and the negative power source line VEE. In this case, the flexibility in the layout increases, which allows securing wider space between elements. Therefore, the yield increases.

In contrast, as in this embodiment, by using the common reference power source, it is possible to reduce the number of reference power source line, thereby simplifying the pixel circuit.

The signal line 16 is connected to the signal line driving circuit 5 and to each pixel belonging to a pixel column including the pixel 10, and is capable of supplying the signal voltage for determining the intensity of light-emission.

The display device 1 also includes signal lines 16 as many as the number of the pixel columns.

The scanning line 17 is connected to the scanning line driving circuit 4, and to the pixels belonging to the pixel row including the pixel 10. With this configuration, the scanning line 17 is capable of supplying the timing for writing the signal voltage on the pixels belonging to the pixel row including the pixel 10, and is capable of supplying the timing for applying the reference voltage VREF to the gate of the driving transistor 14 included in the pixel.

The control line 18 is connected to the scanning line driving circuit 6, and connected to the pixels belonging to the pixel row including the pixel 10. With this configuration, the control line 18 is capable of controlling the timing for connecting the electrode 32 in the capacitor 13 and the source of the driving transistor 14.

The display device 1 includes the scanning lines 17 as many as the number of the pixel rows, and the control line 18.

Note that, although not illustrated in FIG. 1, the reference power source line 20, the positive power source line 21 which is the first power source line, and the negative power source line 22 which is the second power source line are connected to the other pixels and the voltage source.

Since the display device 1 has the configuration described above, the display device 1 can write and erase video on the display unit at the came time. Accordingly, the video does not have to be collectively displayed after the end of the writing, as in the conventional techniques, and the video may be displayed for each row in the display unit before the writing ends.

More specifically, the switching transistor 12 is conducted by the first pulse signal among the scanning signal supplied from the scanning line driving circuit 4 to the scanning line 17, and the reference potential VREF is supplied from the reference power source line 20 to the gate electrode of the driving transistor 14 so as to turn the driving transistor 14 into the non-conduction state. With this, the organic EL element 15 is set to a quenched state. The second pulse signal of the scanning signals supplied from the scanning line driving circuit 4 to the scanning line 17 turns the switching transistor 11 into the conduction state, and the light-emission data from the signal line 16 is written on the capacitor 13. The control signal supplied from the light-emission control circuit 6 to the control line 18 turns the switching transistor 19 into the conduction state, and a voltage corresponding to the light-emission data written on the capacitor 13 is applied between the gate electrode and the source electrode of the driving transistor 14. With this, the organic EL element 15 emits light.

To put it differently, when the display unit is set to the quenched state, a signal in L is provided to the control line 18 (merge OFF) and a pulse signal in H is provided to the scanning line 17 (scan ON). When writing the video signal on the display unit, the signal in L is provided to the control line 18 (merge OFF), the pulse signal in H is provided to the scanning line 17 (scan ON), so as to stabilize the source line potential, and the signal in L is provided to the scanning line 17 (scan OFF). Furthermore, when changing the display unit into the light-emission state, the signal in H is provided to the control line 18 (merge ON).

The following shall describe the configuration and the operation of the scanning line driving circuit 4 which supplies the scanning signal to the scanning line 17.

Figure 2:
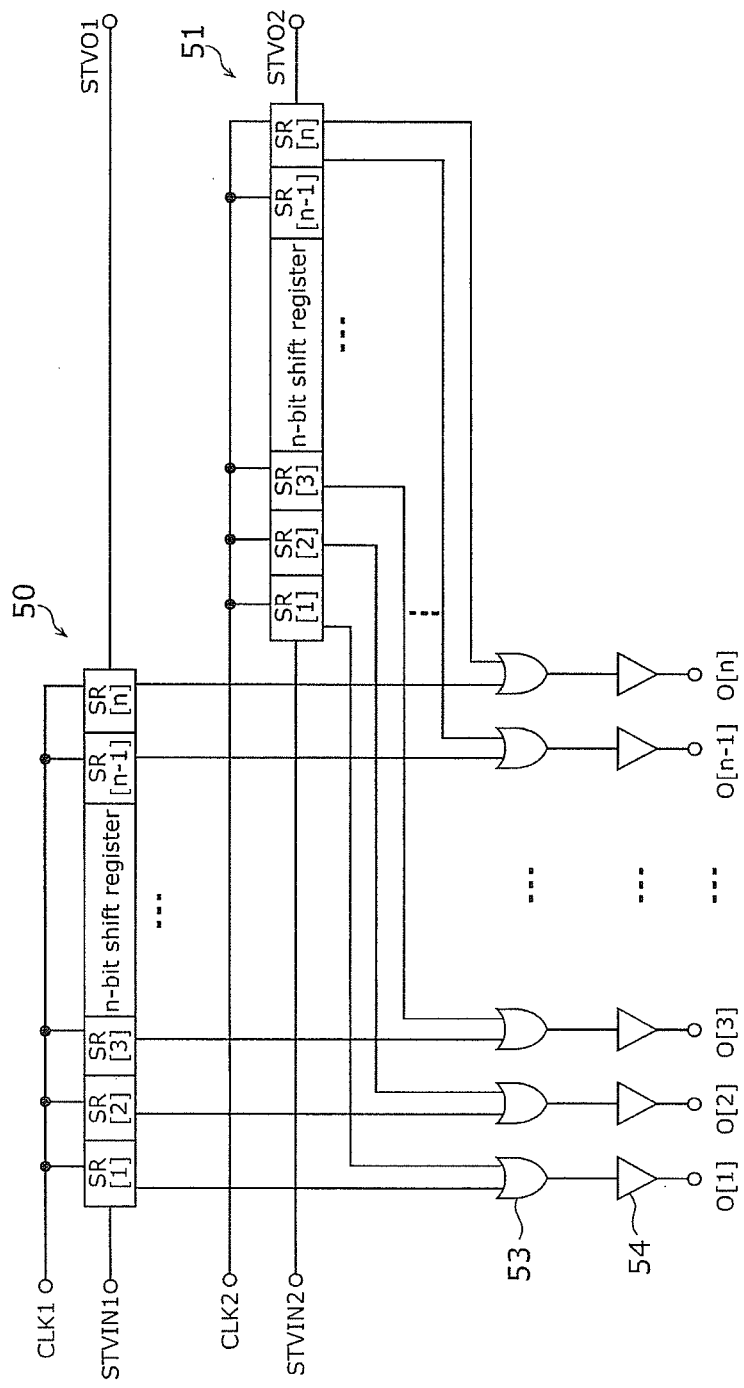
FIG. 2 illustrates a configuration of a scanning line driving circuit according to the embodiment 1.

FIG. 2 illustrates the configuration of the scanning line driving circuit 4 according to the embodiment 1. The scanning line driving circuit 4 supplies the scanning signal to the pixel 10 composed of n-type transistor having a gate which conducts in response to the pulse signal in H.

As illustrated in FIG. 2, the scanning line driving circuit 4 is a gate driver including the shift registers 50 and 51, an OR gate 53, and an output buffer 54.

The shift register 50 is a shift register for supplying the control signal for the quenched state to the scanning line 17. The shift register 50 is an n-stage shift register, and each stage SR[1], SR[2], . . . , SR[n] are connected to corresponding input terminals in the OR gate 53. The shift register 50 is synchronized to the clock CLK1 supplied from the control circuit, and outputs a signal in H or L input to the STVIN1 to the OR gate 53.

The shift register 51 is a shift register for supplying the control signal for writing the video to the scanning line 17. The shift register 51 is a shift register of n stages, and bits SR[1], SR[2], . . . , SR[n] are connected to corresponding input terminals in the OR gate 53 to which the stages SR[1], SR[2], . . . , SR[n] in the shift register 50 are connected, respectively. The shift register 51 is synchronized to the clock CLK2 supplied from the control circuit, and outputs a signal in H or L input to the STVIN2 to the OR gate 53.

The output terminals in the OR gate 53 are connected to corresponding output terminals O[1], O[2], . . . , O[n], through the output buffer 54. The OR gate 53 outputs signal in H or L which is OR of the signals in H or L output from the shift registers 50 and 51. More specifically, the OR gate 53 outputs a pulse signal in H when the shift register 50 or the shift register 51 outputs a pulse signal in H.

The signal in H or L output from the OR gate 53 is output from the output terminals O[1] to O[n] through the output buffer 54. The signals output from the output terminals O[1] to O[n] are supplied to the scanning lines 17 in the pixel rows corresponding to the output terminals.

Figure 3:
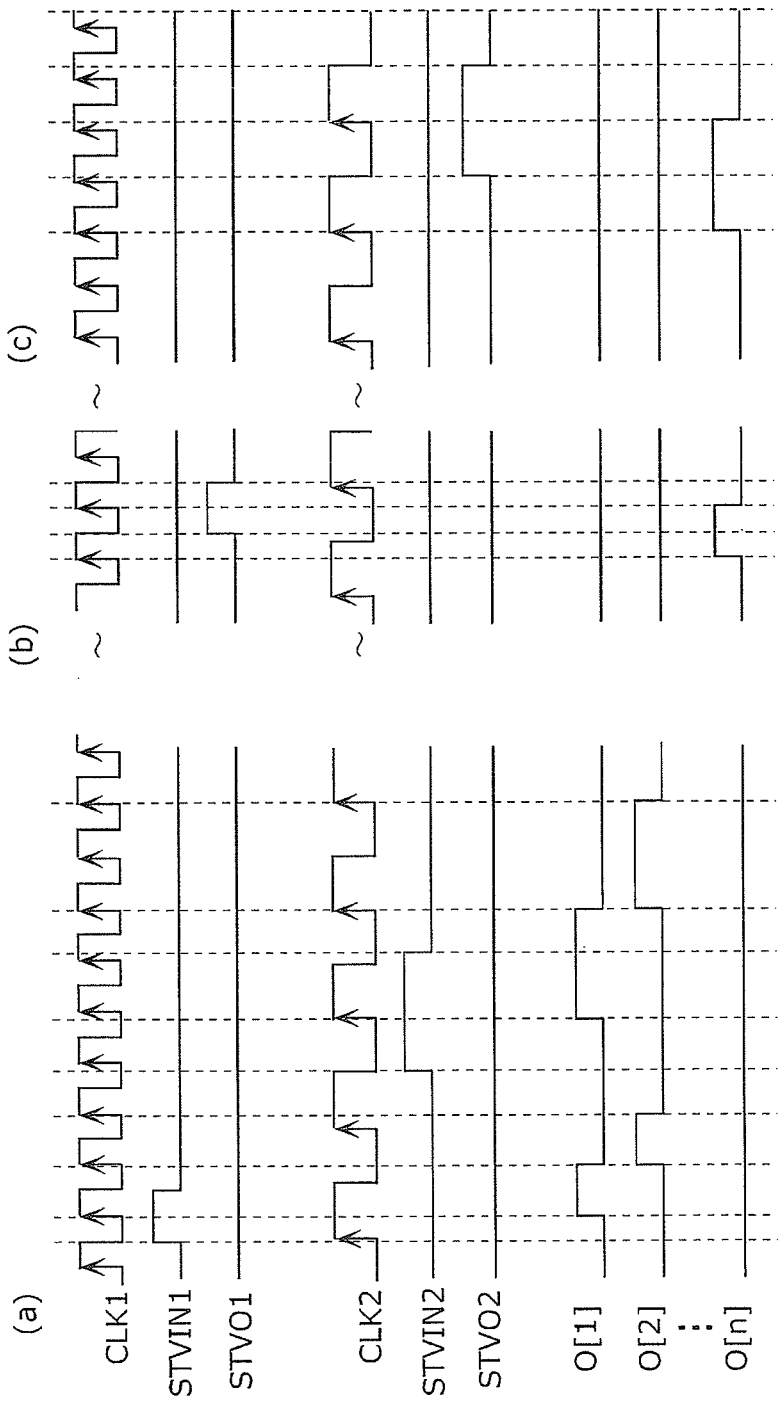
FIG. 3 is a timing chart illustrating the operation of the scanning line driving circuit illustrated in FIG. 2.

FIG. 3 is a timing chart illustrating the operation by the scanning line driving circuit 4 illustrated in FIG. 2.

A cycle of CLK1 for outputting the first pulse signal for the quenched state is shorter than a cycle of CLK2 for outputting the second pulse signal for writing the video, and CLK1 is provided to the shift register 50.

With this operation, as illustrated in (a) to (c) in FIG. 3, in the scanning line driving circuit 4, the first pulse signals for the quenched state are sequentially output from the output terminals O[1] to O[n] to the scanning line 17. Subsequently, the second pulse signals for writing video are sequentially output from the output terminals O[1] to O[n] to the scanning line 17.

Figure 4:
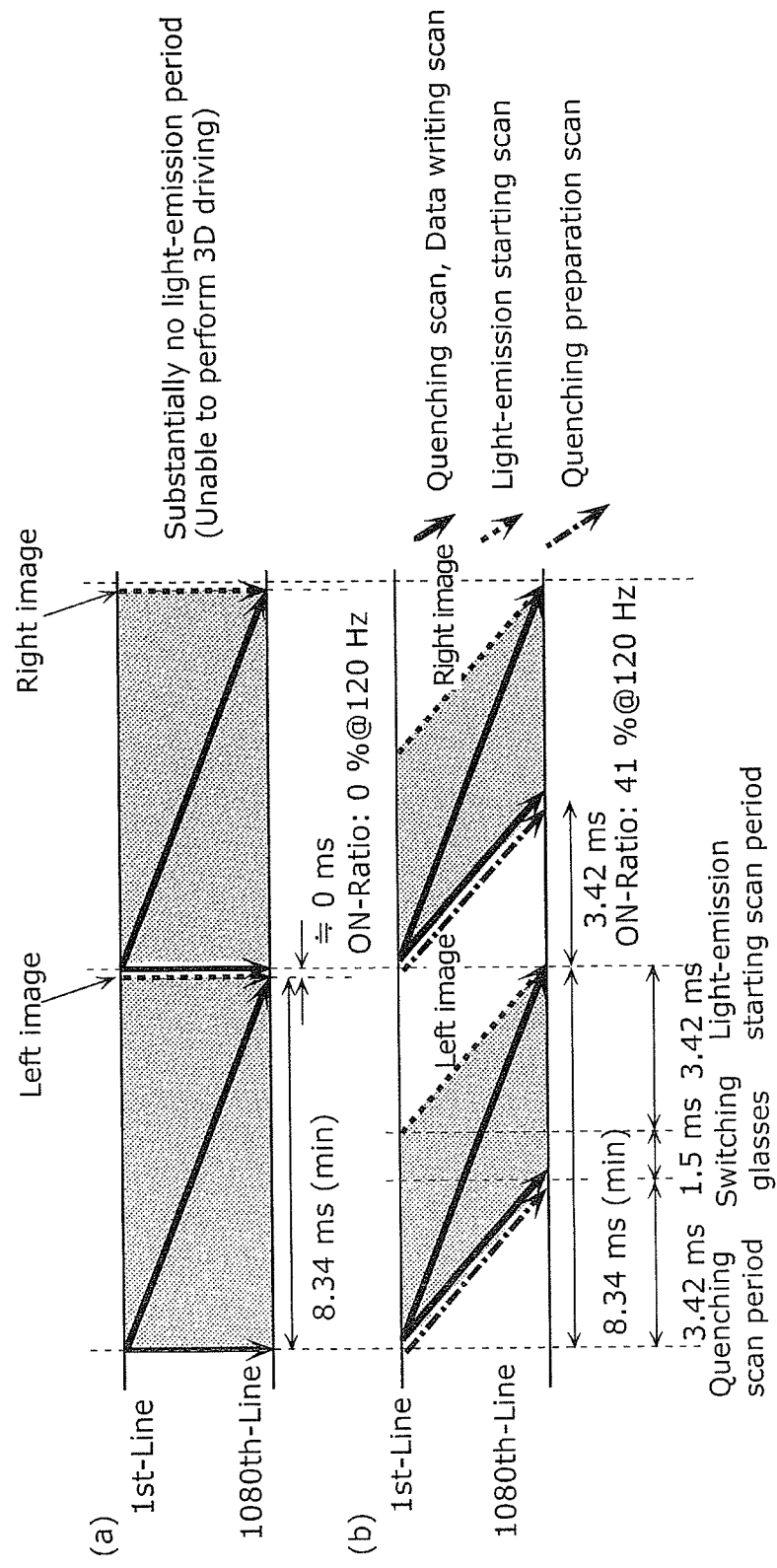
FIG. 4 illustrates an example of video display on the pixel, (a) illustrates a conventional video display, and (b) illustrates a video display according to an exemplary embodiment.

FIG. 4 illustrates an example of 3D video display in a pixel, (a) illustrates the conventional 3D video display, and (b) illustrates 3D video display by the operation of the scanning line driving circuit illustrated in FIG. 2.

In (a) and (b) in FIG. 4, arrows in chain lines indicating quenching preparation scan indicates timing of scanning for changing the state of the control line 18 from H to L, arrows in solid lines indicating quenching scan and data writing scan indicates timing of scanning the scanning line 17 with pulse signals in H, and arrows in broken lines indicating the light-emission starting scan indicates timing of scanning the control line 18 for switching from L to H. The arrows in solid lines with two different slopes indicate the scanning by the first pulse signal which is the scanning signal and the second pulse signal which has a different scanning speed form the first pulse signal. The arrows in the chain lines and the arrows in the broken lines indicate the scanning by the control signal. As an example, the video display when a scanning period for one frame is 8.34 ms, a scanning period for the quenching scan is 3.42 ms, a scanning period for the data writing scan is 8.34 ms, and a scanning period for light-emission starting scan is 3.42 ms shall be described.

In the case of video display by the conventional display device illustrated in (a) in FIG. 4, most of the period in one frame is necessary for writing, and the light-emission time is nearly 0%. In contrast, in the case of the video display according to the embodiment 1 illustrated in (b) in FIG. 4, the light-emission can be sequentially started without waiting for the end of the writing on the entire screen. Accordingly, the light-emission by the pixels is possible in a period for 41% of one frame. Furthermore, in this case, 1.5 ms can be provided as a period for switching glasses during a black display period between a display of the right-eye image and a display of the left-eye image. Accordingly, 3D video can be displayed.

More specifically, in the pixels 10, with the operation of the scanning line driving circuit 4 described above, the quenched state sequentially starts per row of the pixels 10, based on the first pulse signals of the scanning signals input through the scanning line 17, and the light-emission data from the data line is written, based on the second pulse signals of the scanning signals. The driver starts writing the light-emission data on the first row of the pixels 10 before the quenched state of the last row of the pixels starts, and finishes writing the light-emission data on the last row of the pixels 10 after the light-emission state of the first row of the pixels 10 starts.

As illustrated in FIG. 3, by setting the cycle of CLK2 longer than the cycle of CLK1, the speed of writing the video signal is slower than the speed of light-emission or quenching. Furthermore, despite that the speed of writing the video is the same as the conventional driving method, it is possible to extend the time for light-emission.

In the embodiment 1 described above, the description has been made using the first pulse as the pulse signal for quenching (a pulse based on CLK1 which is the first signal), and the second pulse as the pulse signal for writing video (a pulse based on CLK2 which is the second signal).

However, in the present disclosure, the first pulse (the pulse based on CLK1 which is the first signal) may be used as the pulse signal for writing video, and the second pulse (the pulse based on CLK2 which is the second pulse) may be used as the pulse signal for light emission. In this case, the cycle of CLK1 is longer than the cycle of CLK2.

With the configuration described above, 3D video display which was impossible by the conventional display device illustrated in (a) in FIG. 4 can be realized.

Figure 5:
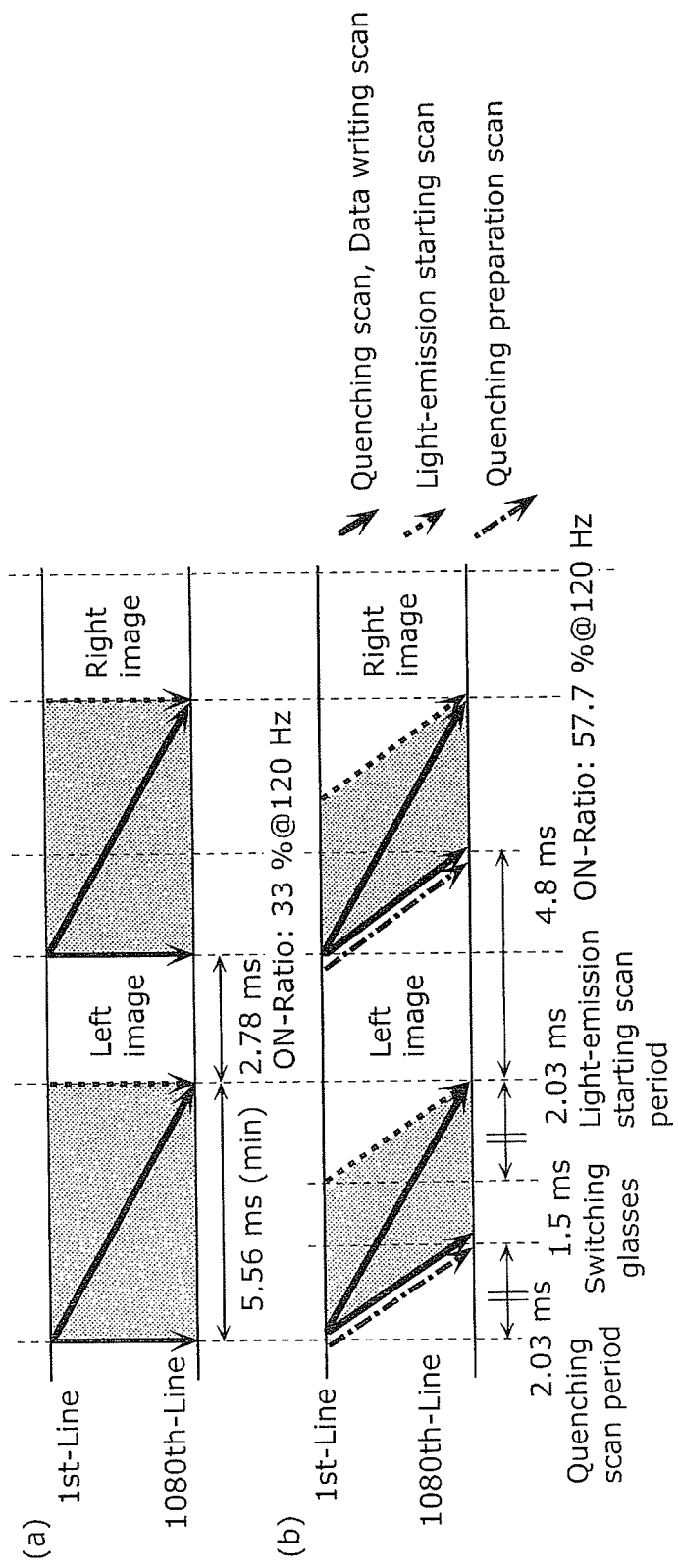
FIG. 5 illustrates another example of video display on the pixel, (a) illustrates a conventional video display in which a writing speed is changed from an example illustrated in FIGS. 4 (a), and (b) illustrates video display by an operation with a writing speed different from the example illustrated in FIG. 4 (b) in the present disclosure.

FIG. 5 illustrates another example of the 3D video display on a pixel, (a) illustrates the conventional 3D video display, and (b) illustrates the 3D video display according to the present disclosure.

In (a) and (b) in FIG. 5, as an example, a video display when the scanning period for one frame is 8.34 ms, the scanning period for quenching scan is 2.03 ms, the scanning period for data writing scan is 5.56 ms, and the scanning period for the light-emission starting scan is 2.03 ms shall be described. Accordingly, in this example, the cycle of CLK2 is longer than the cycle of CLK1.

In the case of the video display by the conventional display device illustrated in (a) in FIG. 5, 5.56 ms is necessary for writing in one frame, and the light-emission time is 2.78 ms. In contrast, when displaying the video by the display device according to the embodiment illustrated in (b) in FIG. 5, the light-emission can be sequentially started without waiting for the end of the writing on the entire screen. Accordingly, a light-emission period of 4.8 ms can be provided. Therefore, the pixels can emit light in the period for 57.7% of one frame. Furthermore, 1.5 ms is provided as a period for switching glasses during the black display period between the display of the right-eye image and the display of the left-eye image. Accordingly, 3D video can be displayed.

By setting the cycle of CLK2 longer then the cycle of CLK1, the speed of writing the video signals are slower than the speed of light-emission or quenching. Furthermore, despite that the speed of writing the video is the same as the conventional driving method, it is possible to increase the time for light-emission.

With the configuration described above, it is possible to display video with luminance higher than the conventional technique by 73%, while maintaining the writing speed of the conventional video signal. With this, it is possible to display bright 3D video of high image quality.

Embodiment 2

The following shall describe the embodiment 2 of the present disclosure.

Figure 6:
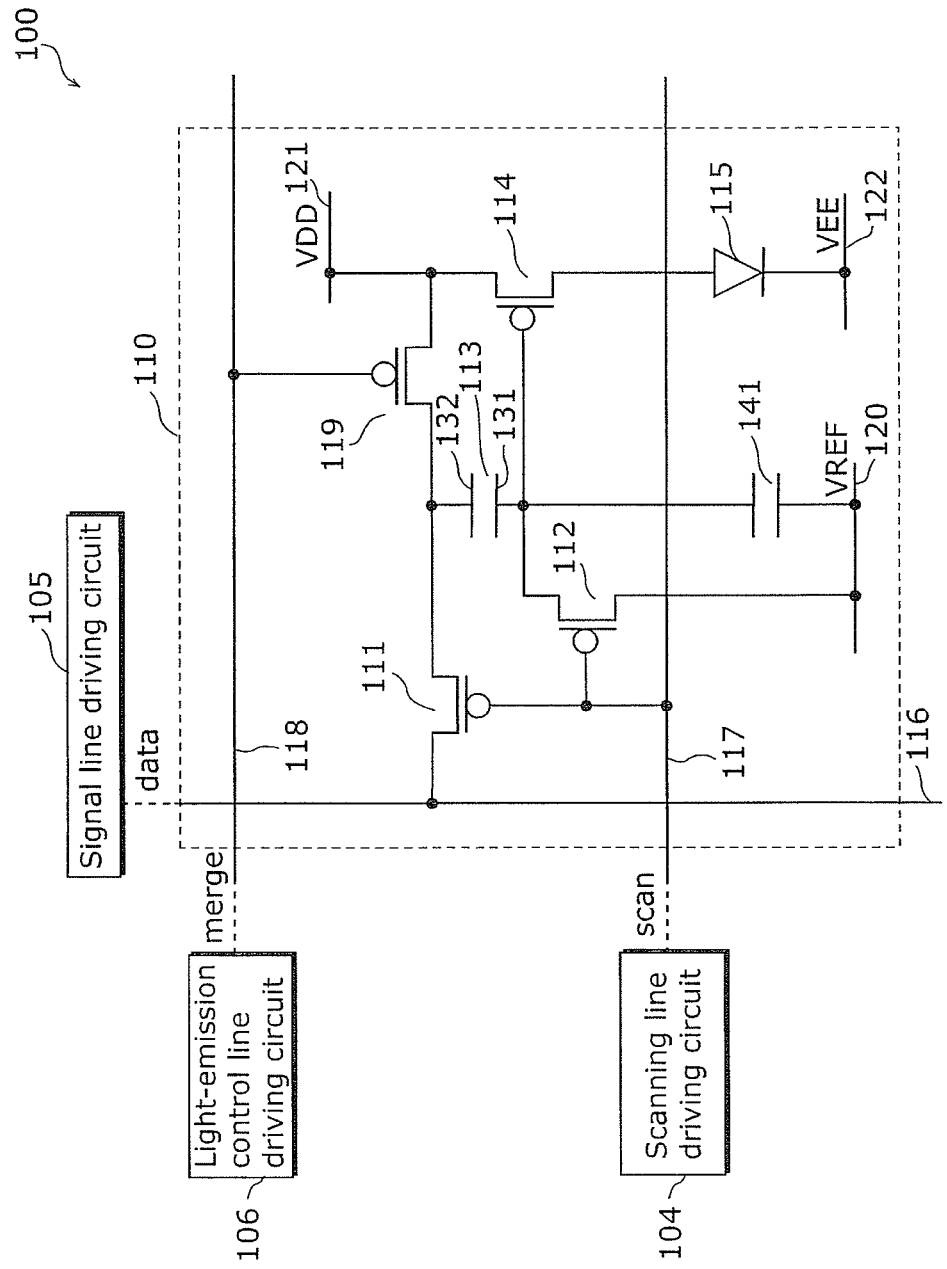
FIG. 6 illustrates a configuration of a circuit in a pixel and connections with peripheral circuits included in the display device according to the embodiment 2.

FIG. 6 is a diagram illustrating a circuit configuration of a pixel and connection with peripheral circuits in the display device according to the embodiment 2.

As illustrated in FIG. 6, the display device 100 according to the embodiment 2 includes the display unit having the multiple pixels 110. The display device 100 further includes the scanning line driving circuit 104, the signal line driving circuit 105, the light-emission control line driving circuit 106, the control circuit which controls the scanning line driving circuit 104, the signal line driving circuit 105, and the light-emission control line driving circuit 106 (not illustrated), as the peripheral circuits of the display unit. Note that, since the configurations of the peripheral circuits are identical to the configurations of the peripheral circuits illustrated in the embodiment 1, the description for the peripheral circuits is omitted.

The pixel 110 in FIG. 6 includes, a switching transistor 111, switching transistors 112 and 119, a capacitor 113, a driving transistor 114, an organic EL element 115, a signal line 116, a scanning line 117, a control line 118, a reference power source line 120, a positive power source line 121, and a negative power source line 122.

The embodiment 2 is different from the embodiment 1 in that the pixel included in the display device is made of a p-type transistor. With regard to the components illustrated in FIG. 6, description for the points that are identical to the components according to the embodiment 1 is omitted, and the following description relates only to the differences in connection and function.

The switching transistor 111 is the second switching transistor, and has a gate connected to the scanning line 117, one of a source and a drain connected to the signal line 116 which is the data line, and the other of the source and the drain is connected to the electrode 132 which is a second electrode of the capacitor 113. The switching transistor 111 is capable of determining the timing for applying the signal voltage in the signal line 116 to the electrode 132 in the capacitor 113.

The switching transistor 112 is the first switching transistor, and has a gate connected to the scanning line 117, one of a source and a drain is connected to the reference power source line 120, and the other of the source and the drain is connected to the electrode 131 which is a first electrode of the capacitor 113. The switching transistor 112 is capable of determining timing for applying a reference voltage VREF of the reference power source line 120 to the electrode 131 of the capacitor 113. The switching transistor 111 and the switching transistor 112 are, for example, p-type thin film transistors (p-type TFT).

The capacitor 113 is a capacitor having an electrode 131 which is a first electrode connected to the gate of the driving transistor 114, and an electrode 132 which is the second electrode connected to the source of the driving transistor 114 through the switching transistor 119. The capacitor 113 is capable of stabilizing current supply from the driving transistor 114 to the organic EL element 115 by holding voltage corresponding to the signal voltage supplied from the signal line 116, and for example, stably holding a gate-source potential in the driving transistor 114 after the switching transistor 111 and the switching transistor 112 are switched off.

The driving transistor 114 is a driving element having a drain connected to the positive power source line 21, which is the first power source line, and a source connected to an anode of the organic EL element 115. The driving transistor 114 converts a voltage corresponding to the signal voltage applied between the gate and source into a drain current corresponding to the signal voltage. Subsequently, the driving transistor 114 supplies the drain current to the organic EL element 15 as the signal current. The driving transistor 114 is composed of, for example, a p-type thin-film transistor (p-type TFT).

The organic EL element 115 is a light-emitting element having a cathode connected to the negative power source line 122 which is the second power source line, and emits light when a current from the driving transistor 114 flows.

The switching transistor 119 is the third switching transistor having a gate connected to the control line 118, one of the source and the drain connected to the source of the driving transistor 114, and the other of the source and the drain connected to the electrode 32 in the capacitor 113. The switching transistor 119 is capable of determining timing for applying, between the gate and source of the driving transistor 114, the potential held by the capacitor 113. The driving transistor 119 is composed of, for example, a p-type thin-film transistor (p-type TFT).

The capacitor 141 is the second capacitor connected between the electrode 131 which is the first electrode of the capacitor 113 and the reference power source line 120. First, the capacitor 141 stores the source potential of the driving transistor 114 in steady state with the switching transistor 119 conducted. Subsequently, even if the switching transistor 119 is switched off, the potential in the electrode 132 of the capacitor 113 is set, thereby setting the gate voltage of the driving transistor 114. In contrast, the source potential of the driving transistor 114 is always in the steady state. As a result, the capacitor 141 is capable of stabilizing the gate-source voltage of the driving transistor 114.

Note that, the capacitor 141 may be connected to a reference power source line different from the reference power source line 120 which is the first power source line to which one of the source and the drain of the switching transistor 112 is connected. For example, the reference power source line may be the positive power source line VDD and the negative power source line VEE. In this case, the flexibility in the layout increases, which allows securing wider space between elements. Therefore, the yield increases.

In contrast, as in this embodiment, by using the common reference power source, it is possible to reduce the number of reference power source line, thereby simplifying the pixel circuit.

The signal line 116 is connected to the signal line driving circuit 5 and to each pixel belonging to a pixel column including the pixel 110, and is capable of supplying the signal voltage for determining the intensity of light-emission.

The display device 100 also includes signal lines 116 as many as the number of the pixel columns.

The scanning line 117 is connected to the scanning line driving circuit 104, and to the pixels belonging to the pixel row including the pixel 110. With this configuration, the scanning line 117 is capable of supplying the timing for writing the signal voltage on the pixels belonging to the pixel row including the pixel 110, and is capable of supplying the timing for applying the reference voltage VREF to the gate of the driving transistor 114 included in the pixel.

The control line 118 is connected to the scanning line driving circuit 106, and connected to the pixels belonging to the pixel row including the pixel 110. With this, the control line 118 is capable of controlling timing for connecting the electrode 132 in the capacitor 113 and the source of the driving transistor 114.

The display device 100 includes the scanning lines 117 as many as the number of the pixel rows, and the control line 118.

Note that, although not illustrated in FIG. 1, the reference power source line 120, the positive power source line 121 which is the first power source line, and the negative power source line 122 which is the second power source line are connected to the other pixels and the voltage source.

The display device 100 with the configuration described above allows writing and erasing video at the same time. Accordingly, it is not necessary to display the video collectively after the writing ends, as in the conventional technique, and the video can be displayed in the display unit for each row, before the writing ends.

More specifically, the switching transistor 112 is conducted by the first pulse signal among the scanning signal supplied from the scanning line driving circuit 104 to the scanning line 117, and the reference potential VREF is supplied from the reference power source line 120 to the gate electrode of the driving transistor 114 so as to turn the driving transistor 114 into the non-conduction state. With this, the organic EL element 115 is set to a quenched state. The second pulse signal of the scanning signals supplied from the scanning line driving circuit 104 to the scanning line 117 turns the switching transistor 111 into the conduction state, and the light-emission data from the signal line 116 is written on the capacitor 113. The control signal supplied from the light-emission control circuit 106 to the control line 118 turns the switching transistor 119 into the conduction state, and a voltage corresponding to the light-emission data written on the capacitor 113 is applied between the gate electrode and the source electrode of the driving transistor 114. With this, the organic EL element 115 emits light.

Figure 7:
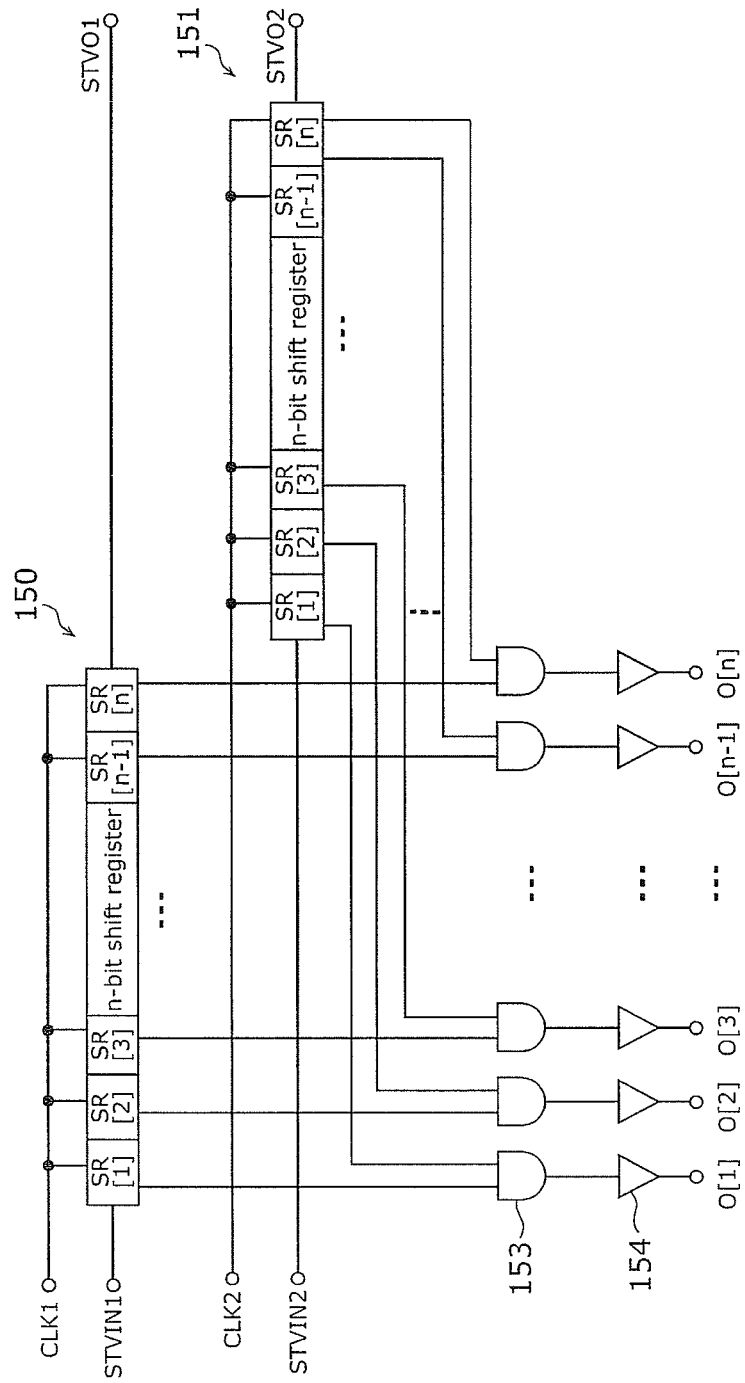
FIG. 7 illustrates a configuration of a scanning line driving circuit according to the embodiment 2.

FIG. 7 illustrates the configuration of the scanning line driving circuit 104 according to the embodiment 2. The scanning line driving circuit 104 supplies the scanning signal to the pixel 110 composed of a p-type transistor having a gate conducted by a pulse signal in L.

As illustrated in FIG. 7, the scanning line driving circuit 104 is a gate driver having shift registers 150 and 151, an AND gate 153, and an output buffer 154.

The shift register 150 is a shift register for supplying the control signal for the quenched state to the scanning line 117. The shift register 150 is an n-stage shift register, and each stage SR[1], SR[2], . . . , SR[n] are connected to corresponding input terminals in the AND gate 153, respectively. The shift register 150 is synchronized to the clock CLK1 supplied from the control circuit, and outputs a signal in H or L input to the STVIN1 to the AND gate 153.

The shift register 151 is a shift register for supplying the control signal for writing the video to the scanning line 117. The shift register 151 is a shift register of n stages, and stages SR[1], SR[2], . . . , SR[n] are connected to corresponding input terminals in the AND gate 153 to which the stages SR[1], SR[2], . . . , SR[n] in the shift register 150 are connected, respectively. The shift register 151 is synchronized to the clock CLK2 supplied from the control circuit, and outputs a signal in H or L input to the STVIN2 to the AND gate 153.

Each output terminal of the AND gate 153 is connected to the output terminals O[1], O[2], . . . , O[n] through the output buffer 154. The AND gate 153 outputs a signal in H or L which is AND of the signals in H or L output from the shift register 150 and 151. Stated differently, the AND gate 153 outputs a pulse signal in L when a pulse signal in L is output from the shift register 150 or 151.

The signal in H or L output from the AND gate 153 is output from the output terminals O[1] to O[n] through the output buffer 154. The signals output from the output terminals O[1] to O[n] are supplied to the scanning lines 117 in the pixel rows corresponding to the output terminals.

Figure 8:
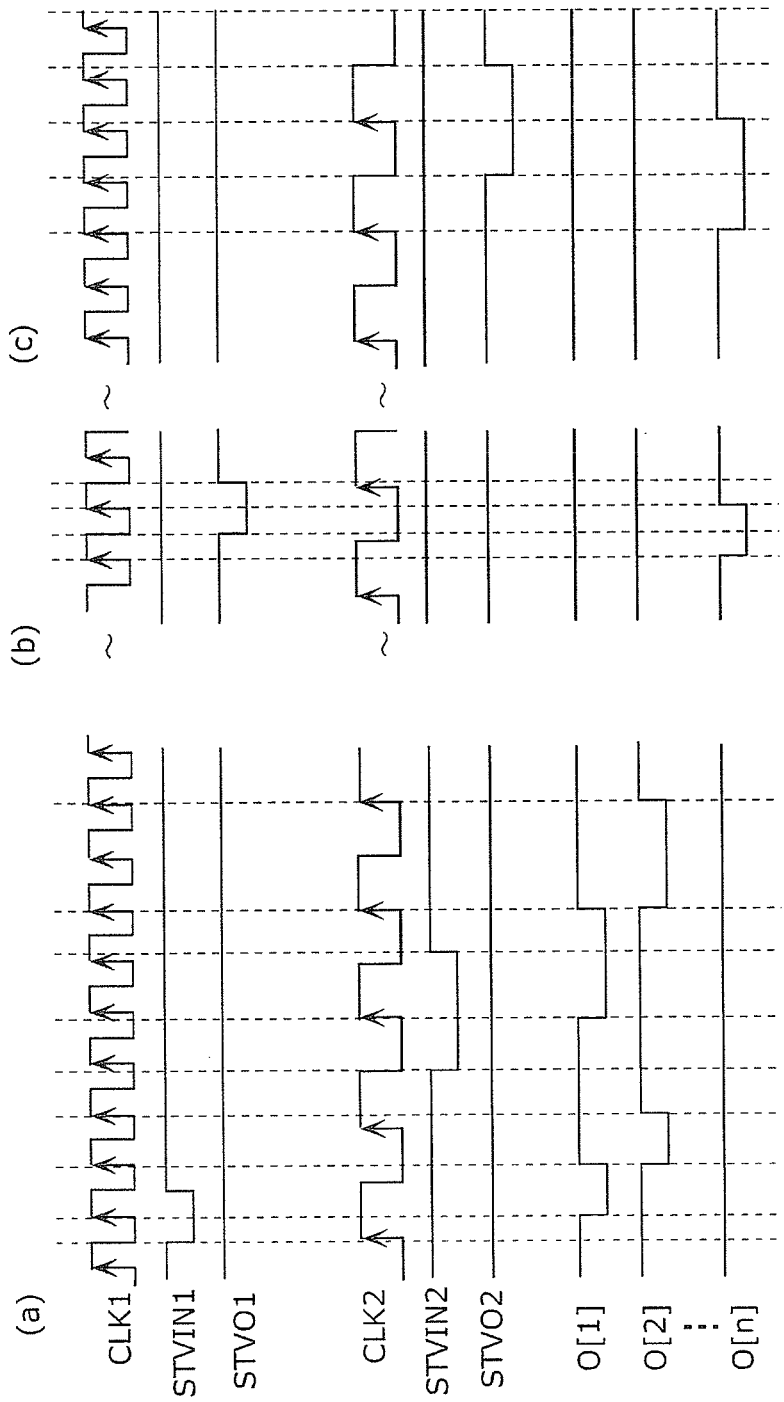
FIG. 8 is a timing chart illustrating the operation of the scanning line driving circuit illustrated in FIG. 7.

FIG. 8 is a timing chart illustrating the operation by the scanning line driving circuit illustrated in FIG. 7.

A cycle of CLK1 for outputting the first pulse signal for the quenched state is shorter than a cycle of CLK2 for outputting the second pulse signal for writing the video, and CLK1 is provided to the shift register 150.

With this operation, as illustrated in (a) to (c) in FIG. 8, in the scanning line driving circuit 104, the first pulse signals for the quenched state are sequentially output from the output terminals O[1] to O[n] to the scanning line 117. Subsequently, the second pulse signals for writing video are sequentially output from the output terminals O[1] to O[n] to the scanning line 117.

With this, the video can be displayed in the same manner as the example of video display illustrated in FIG. 4. Furthermore, the cycle of CLK1 can be twice longer than the cycle of CLK2. With this, the video can be displayed in the same manner as the example of video display illustrated in FIG. 5.

Embodiment 3

Next, the embodiment 3 in the present disclosure shall be described.

Figure 9:
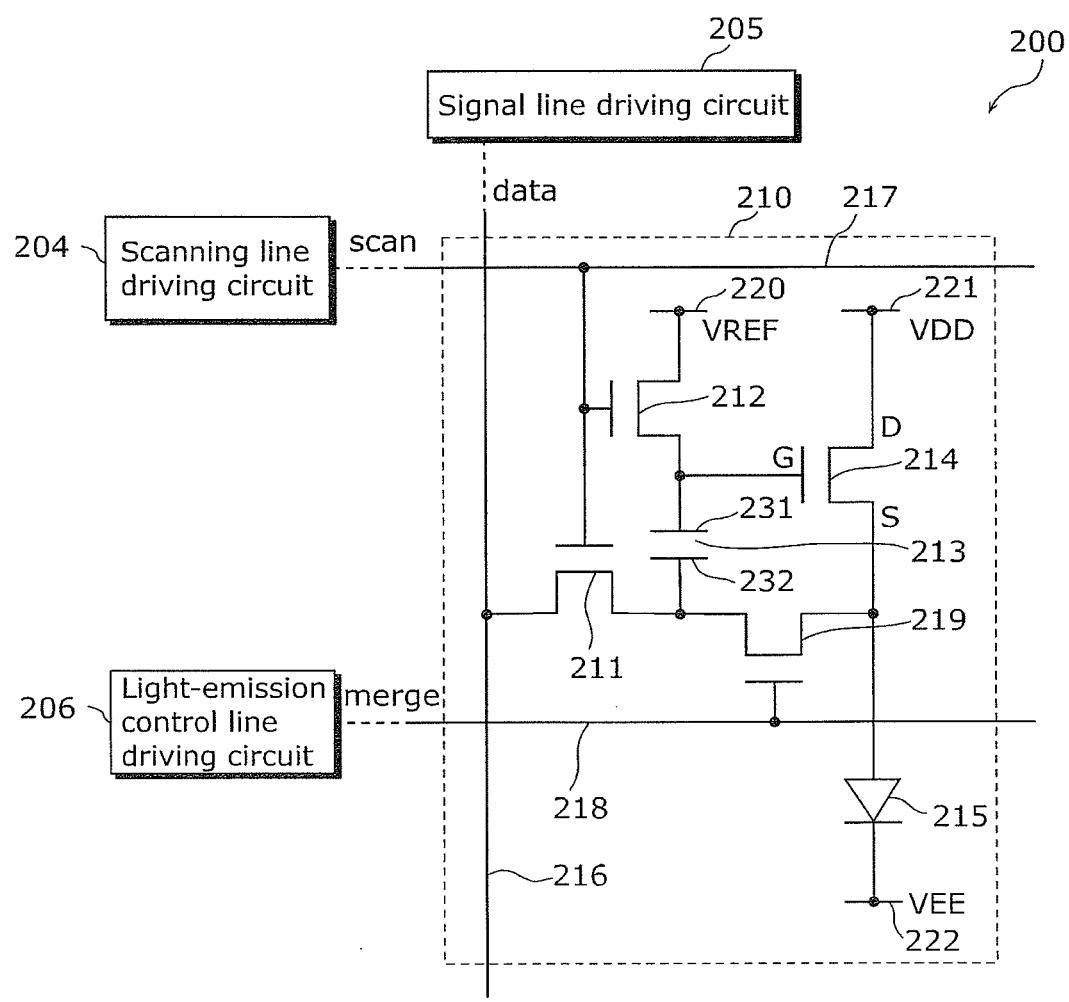
FIG. 9 illustrates a configuration of a circuit in a pixel and connections with peripheral circuits included in the display device according to the embodiment 3.

FIG. 9 illustrates the circuit configuration of the pixel and connections with peripheral circuits in a display device according to the embodiment 3.

As illustrated in FIG. 9, the display device 200 according to the embodiment 3 includes a display unit having multiple pixels 210. As illustrated in FIG. 9, the display device 200 also includes a scanning line driving circuit 204, a signal line driving circuit 205, a light-emission control line driving circuit 206, a control circuit (not illustrated) for controlling the scanning line driving circuit 204, the signal line driving circuit 205, and the light-emission control line driving circuit 206, as the peripheral circuits of the display unit. Note that, the configurations of the peripheral circuits are identical as the configurations of the peripheral circuits described in the embodiment 1. Accordingly, the description for the configurations shall be omitted.

The pixel 210 in FIG. 9 includes a switching transistor 211, switching transistors 212 and 219, a capacitor 213, a driving transistor 214, an organic EL element 215, a signal line 216, a scanning line 217, a control line 218, a reference power source line 220, a positive power source line 221, and a negative power source line 222.

The pixel 210 according to the embodiment 3 is different from the pixel 10 according to the embodiment 1 only in that a capacitor is not provided between the electrode 232 of the capacitor 213 and the reference power source line.

The display device according to the embodiment 3, the configuration of the pixel can be simplified.

Embodiment 4

Next, the embodiment 4 in the present disclosure shall be described.

Figure 10:
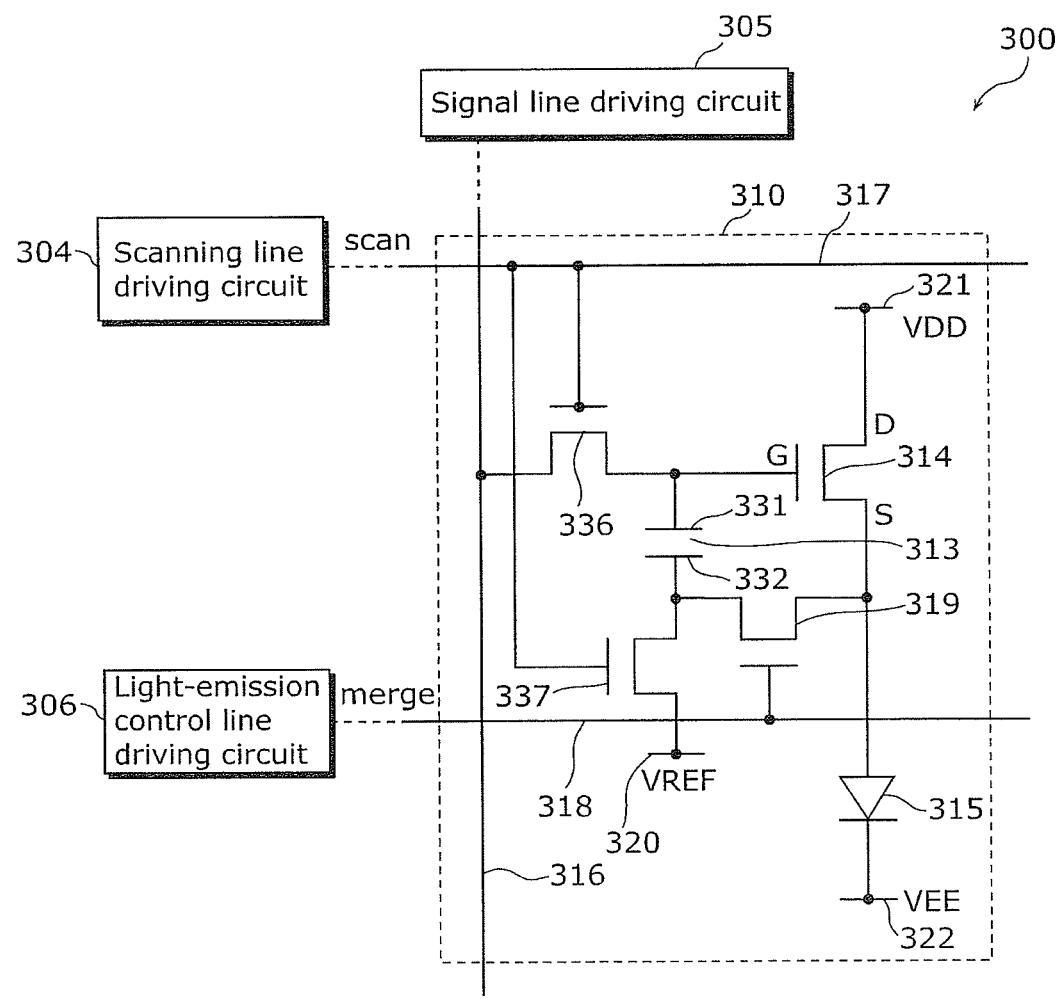
FIG. 10 illustrates a configuration of a circuit in a pixel and connections with peripheral circuits included in the display device according to the embodiment 4.

FIG. 10 illustrates the circuit configuration of the pixel and connections with peripheral circuits in a display device according to the embodiment 4.

As illustrated in FIG. 10, a display device 300 according to the embodiment 4 includes a display unit having multiple pixels 310. The display device 300 includes a scanning line driving circuit 304, a signal line driving circuit 305, a light-emission control line driving circuit 306, a control circuit (not illustrated) for controlling the scanning line driving circuit 304, the signal line driving circuit 305, and the light-emission control line driving circuit 306, as the peripheral circuits of the display unit. Note that, the configurations of the peripheral circuits are identical as the configurations of the peripheral circuits described in the embodiment 1. Accordingly, the description for the configurations shall be omitted.

The pixel 310 in FIG. 10 includes a switching transistor 319, a capacitor 313, a driving transistor 314, an organic EL element 315, a switching transistor 336, a switching transistor 337, a signal line 316, a scanning line 317, a control line 318, a reference power source line 320, a positive power source line 321, and a negative power source line 322.

The pixel 310 according to the embodiment 4 is different from the pixel 210 according to the embodiment 3 only in the connection between the switching transistor and the electrodes 331 and 332 of the ends of the capacitor 313.

With regard to the components illustrated in FIG. 10, description for the components according to the embodiment 2 illustrated in FIG. 9 is omitted, and the difference in connection and function shall be described.

The switching transistor 336 is the second switching transistor, having a gate connected to the scanning line 317, one of the source and the drain connected to the signal line 316 which is the data line, and the other of the source and the drain connected to the electrode 331 of the capacitor 313. The switching transistor 336 is capable of determining the timing for applying the signal voltage of the signal line 316 to the electrode 331 in the capacitor 313.

The switching transistor 337 is the first switching transistor, having a gate connected to the scanning line 317, one of the source and the drain connected to the reference power source line 320, and the other of the source and the drain connected to the electrode 332 of the capacitor 313. The switching transistor 337 is capable of determining the timing for applying the reference voltage VREF of the reference power source line 320 to the electrode 332 in the capacitor 313. The switching transistor 336 and the switching transistor 337 are composed of n-type thin-film transistor (n-type TFT), for example.

The capacitor 313 is a capacitor which holds charge corresponding to the signal voltage supplied from the signal line 316, for example, stably holds the potential between the gate and source electrodes of the driving transistor 314 after the switching transistor 336 and the switching transistor 337 are switched off, and is capable of stabilizing the current supply from the driving capacitor 314 to the organic EL element 315. The switching transistor 319 also has the boot strapping function. More specifically, when the switching transistor 336 and the switching transistor 337 are switched on by the supply of the scanning signal to the scanning line 17, the charge corresponding to the signal voltage supplied to the signal line 316 is held by the capacitor 313. Here, when the switching transistor 319 is switched on, the voltage on the cathode side of the organic EL element 315 is increased by the charge held in the capacitor 313. With this, it is possible to reduce the influence of the variation in the power source voltage on the voltage applied to the organic EL element 315.

According to the display device of the embodiment 3, the current flowing in the driving transistor always passes through the pixel. Accordingly, there is no constant current flow in the power source line and the signal line. Accordingly, it is possible to store an accurate potential on the electrodes at both ends of the capacitor capable of holding the voltage between the gate and the source of the driving transistor, allowing a display of a high-definition image reflecting the video signal.

Embodiment 5

Next, the embodiment 5 in the present disclosure shall be described.

Figure 11:
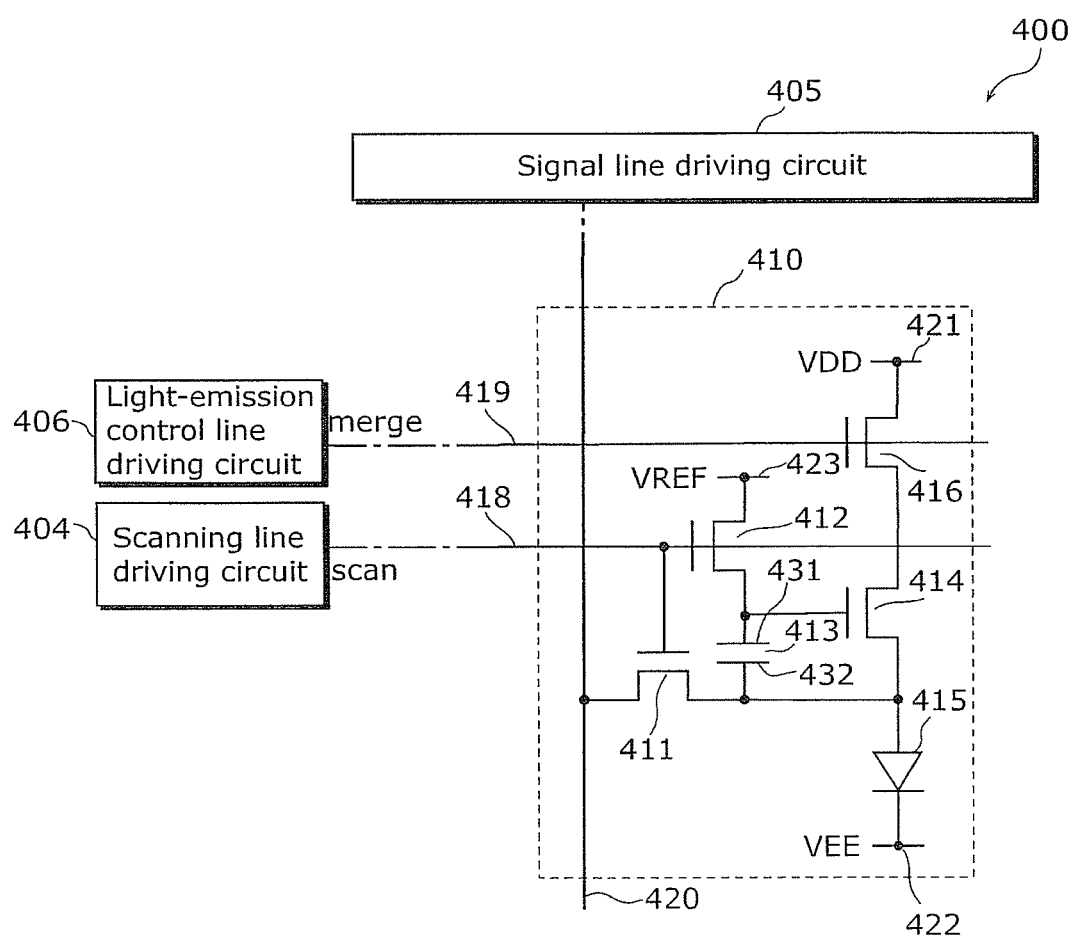
FIG. 11 illustrates a configuration of a circuit in a pixel and connections with peripheral circuits included in the display device according to the embodiment 5.

FIG. 11 illustrates the circuit configuration of the pixel and connections with peripheral circuits in a display device according to the embodiment 5.

As illustrated in FIG. 11, a display device 400 according to the embodiment 5 includes a display unit having the multiple pixels 410. The display device 400 includes a scanning line driving circuit 404, a signal line driving circuit 405, a light-emission control line driving circuit 406, a control circuit (not illustrated) for controlling the scanning line driving circuit 404, the signal line driving circuit 405, and the light-emission control line driving circuit 406, as the peripheral circuits of the display unit. Note that, the configurations of the peripheral circuits are identical as the configurations of the peripheral circuits described in the embodiment 1. Accordingly, the description for the configurations shall be omitted.

The pixel 410 in FIG. 11 includes a switching transistor 411, switching transistors 412 and 416, a capacitor 413, a driving transistor 414, an organic EL element 415, a scanning line 418, a control line 419, a signal line 420, a positive power source line 421, a negative power source line 422, and the reference power source line 423.

The switching transistor 411 is the second switching transistor having a gate connected to the scanning line 418, one of a source and a drain connected to the signal line 420, and the other of the source and the drain connected to the electrode 432 which is the second electrode of the capacitor 413. The switching transistor 411 is capable of determining the timing for applying the signal voltage of the signal line 420 to the electrode 432 in the capacitor 413.

The switching transistor 412 is the first switching transistor having a gate connected to the scanning line 418, one of a source and a drain connected to the signal line 423, and the other of the source and the drain connected to the electrode 431 which is the first electrode of the capacitor 413. The switching transistor 412 is capable of determining the timing for applying the reference voltage VR of the reference power source line 423 to the electrode 431 in the capacitor 413. The switching transistor 411 and the switching transistor 412 are composed of n-type thin-film transistor (n-type TFT), for example.

The capacitor 413 is a capacitor having the electrode 431 connected to the gate of the driving transistor 414, and the electrode 432 connected to the other of the source and drain of the switching transistor 411 and the source of the driving transistor 414. In the capacitor 413, when the switching transistor 411 and the switching transistor 412 are on, the reference voltage VR is applied to the electrode 431, and the data voltage Vdata is applied to the electrode 432, and (VR−Vdata) which is the potential difference of the electrodes is held.

The driving transistor 414 has a gate connected to the electrode 431 of the capacitor 413, a drain connected to one of the source and the drain of the switching transistor 416, and a source connected to an anode, which is the first electrode, of the organic EL element 415. The driving transistor 414 converts a voltage corresponding to the data voltage applied between the gate and source into a drain current corresponding to the data voltage. Subsequently, the drain current is supplied to the organic EL element 415 as the signal current. For example, when the switching transistor 411 and the switching transistor 412 are switched off, and the switching transistor 416 is switched on, the driving transistor 414 is capable of supplying the voltage corresponding to the data voltage Vdata supplied from the signal line 420, that is, the drain current corresponding to the voltage held by the capacitor 413 (VR−Vdata) to the organic EL element 415. The driving transistor 414 is composed of an n-type thin-film transistor (n-type TFT), for example.

The organic EL element 415 is a light-emitting element having an anode connected to the source of the driving transistor 414 and cathode connected to the negative power source line 422, and emits light when a drain current which is the signal current flows from the driving transistor 414.

The switching transistor 416 is the third switching transistor having a gate connected to the control line 419, one of the source and the drain connected to the drain of the driving transistor 414, and the other of the source and the drain connected to the positive power source line 421. The switching transistor 416 is provided between the anode of the organic EL element 415 and the positive power source line 421, connected in series with the driving transistor 414, and is capable of determining on and off of the drain current in the driving transistor 414. The driving transistor 416 is composed of an n-type thin-film transistor (n-type TFT), for example.

With the circuit configuration described above, upon blocking the current flow between the positive power source line 421 and the signal line 420 through the source of driving transistor 414 and the switching transistor 411, the capacitor 413 can hold the voltage of a desired potential difference. With this, it is possible to prevent the change in the potential difference between the terminals of the switching transistor 411 due to the current flowing between the positive power source line 421 and the signal line 420 through the source of the driving transistor 414 and the switching transistor 411. Accordingly, the potential difference between the ends of the switching transistor 411 is stabilized, which allows the capacitor 413 to hold the voltage accurately corresponding to the voltage in the predetermined potential difference from the signal line 420 through the switching transistor 411. As a result, the potential difference between the electrodes of the capacitor 413, that is, the potential difference between the gate and the source of the driving transistor 414 is stabilized, and the drain current corresponding to the voltage of the desired potential difference flows in the organic EL element 415.

Embodiment 6

Next, the embodiment 6 in the present disclosure shall be described.

Figure 12:
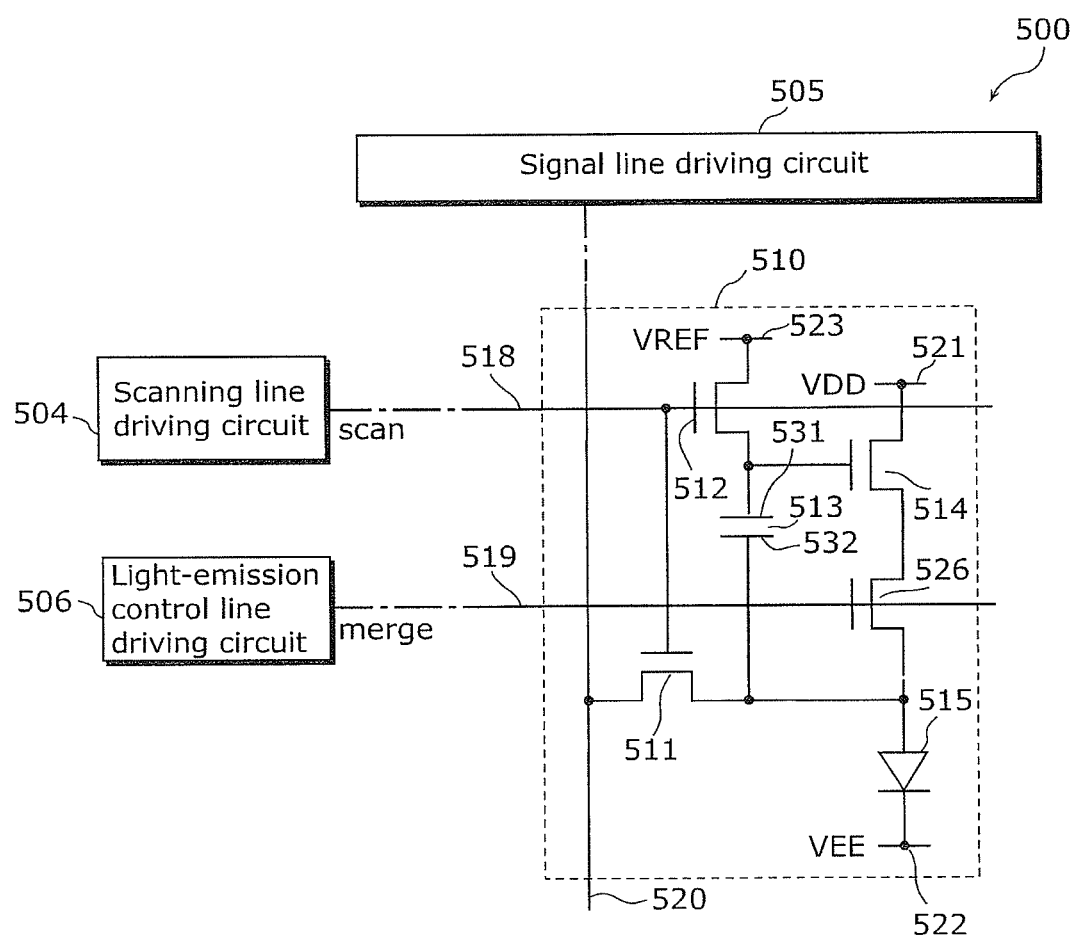
FIG. 12 illustrates a configuration of a circuit in a pixel and connections with peripheral circuits included in the display device according to the embodiment 6.

FIG. 12 illustrates the circuit configuration of the pixel and connections with peripheral circuits in a display device according to the embodiment 6.

As illustrated in FIG. 12, a display device 500 according to the embodiment 6 includes a display unit having the multiple pixels 510. The display device 500 includes a scanning line driving circuit 504, a signal line driving circuit 505, a light-emission control line driving circuit 506, a control circuit (not illustrated) for controlling the scanning line driving circuit 504, the signal line driving circuit 505, and the light-emission control line driving circuit 506, as the peripheral circuits of the display unit. Note that, the configurations of the peripheral circuits are identical as the configurations of the peripheral circuits described in the embodiment 5. Accordingly, the description for the configurations shall be omitted.

The pixel 510 in FIG. 12 includes a switching transistor 511, switching transistors 512 and 526, a capacitor 513, a driving transistor 514, an organic EL element 515, a scanning line 518, a control line 519, a signal line 520, a positive power source line 521, a negative power source line 522, and the reference power source line 523.

The display device according to the embodiment 6 is different from the display device according to the embodiment 5 only in the circuit configuration of the pixel. Note that the description for the display device according to the embodiment 5 shall be omitted, and only the difference shall be described.

The driving transistor 514 is a driving element having a gate connected to the electrode 531 of the capacitor 513, a drain connected to the positive power source line 521, and a source connected to one of the source and the drain of the switching transistor 526. The driving transistor 514 converts the voltage corresponding to the data voltage applied between its gate and the other of the source and the drain of the switching transistor 526 to the drain current corresponding to the data voltage. Subsequently, the drain current is supplied to the organic EL element 515 as the signal current. For example, when the switching transistor 511 and the switching transistor 512 are switched off, and the switching transistor 526 is switched on, the driving transistor 514 is capable of supplying the voltage corresponding to the data voltage Vdata supplied from the signal line 520, that is, the drain current corresponding to the voltage held by the capacitor 513 (VR−Vdata) to the organic EL element 515. The driving transistor 514 is composed of an n-type thin-film transistor (n-type TFT), for example.

The organic EL element 515 is a light-emitting element having an anode connected to the other of the source and the drain of the driving transistor 526 and cathode connected to the negative power source line 522, and emits light when a drain current which is the signal current flows from the driving transistor 514.

The switching transistor 526 is the third switching transistor having a gate connected to the control line 519, one of the source and the drain is connected to the source of the driving transistor 514, and the other of the source and the drain connected to the anode of the organic EL element 515. The switching transistor 526 is provided between the anode of the organic EL element 515 and the positive power source line 521, connected in series with the driving transistor 514, and is capable of determining on and off of the drain current in the driving transistor 514. The driving transistor 526 is composed of an n-type thin-film transistor (n-type TFT), for example.

With the circuit configuration described above, upon blocking the current flow between the positive power source line 521 and the signal line 520 through the source of driving transistor 514 and the switching transistor 511 by the switching transistor 526, the capacitor 513 can hold the voltage of a desired potential difference. With this, it is possible to prevent the change in the potential difference between the terminals of the switching transistor 511 due to the current flowing between the positive power source line 521 and the signal line 520 through the source of the driving transistor 514 and the switching transistor 511. Accordingly, the potential difference between the ends of the switching transistor 511 is stabilized, which allows the capacitor 513 to hold the voltage accurately corresponding to the voltage in the predetermined potential difference from the signal line 520 through the switching transistor 511. As a result, the potential difference between the gate and the source of the driving transistor 514 is stabilized. With this, an accurate drain current accurately corresponding to the desired potential difference can flow in the organic EL element 515.

Embodiment 7

Next, the embodiment 7 in the present disclosure shall be described.

Figure 13:
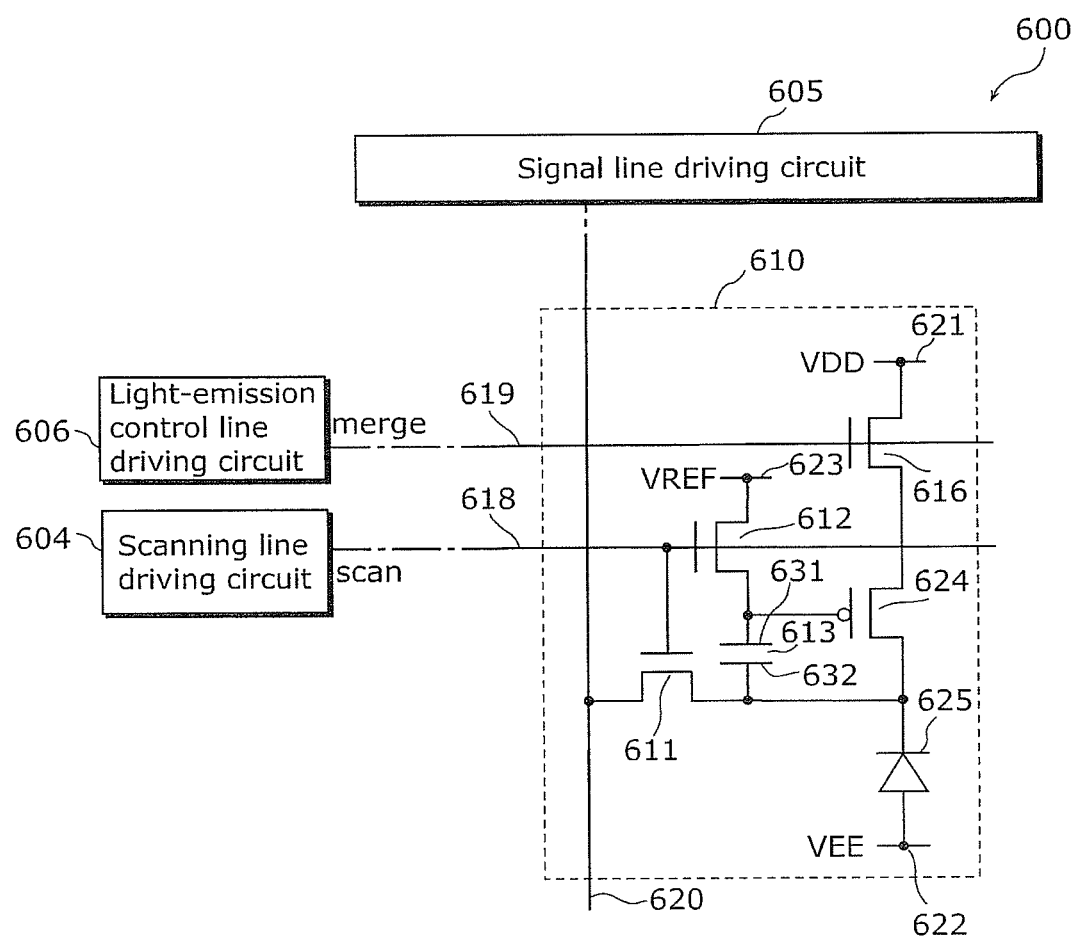
FIG. 13 illustrates a configuration of a circuit in a pixel and connections with peripheral circuits included in the display device according to the embodiment 7.

FIG. 13 illustrates the circuit configuration of the pixel and connections with peripheral circuits in a display device according to the embodiment 7.

As illustrated in FIG. 13, a display device 600 according to the embodiment 7 includes a display unit having the multiple pixels 610. The display device 600 includes a scanning line driving circuit 604, a signal line driving circuit 605, a light-emission control line driving circuit 606, a control circuit (not illustrated) for controlling the scanning line driving circuit 604, the signal line driving circuit 605, and the light-emission control line driving circuit 606, as the peripheral circuits of the display unit. Note that, the configurations of the peripheral circuits are identical as the configurations of the peripheral circuits described in the embodiment 5. Accordingly, the description for the configurations shall be omitted.

The pixel 610 in FIG. 11 includes a switching transistor 611, switching transistors 612 and 616, a capacitor 613, a driving transistor 624, an organic EL element 625, a scanning line 618, a control line 619, a signal line 620, a positive power source line 621, a negative power source line 622, and the reference power source line 623.

The display device according to the embodiment 7 is different from the display device according to the embodiment 5 only in the circuit configuration of the pixel. More specifically, the driving transistor is of p-type, and the source of the transistor and the cathode of the organic EL element are connected. Note that the description for components identical to the display device according to the embodiment 5 shall be omitted, and only the difference shall be described.

The driving transistor 624 has a gate connected to the electrode 631 of the capacitor 613, a drain connected to one of the source and the drain of the switching transistor 616, and a source connected to an anode, which is the first electrode, of the organic EL element 615. The driving transistor 624 converts a voltage corresponding to the data voltage applied between the gate and source into a drain current corresponding to the data voltage. Subsequently, the drain current is supplied to the organic EL element 625 as the signal current. For example, when the switching transistor 611 and the switching transistor 612 are switched off, and the switching transistor 616 is switched on, the driving transistor 624 is capable of supplying the voltage corresponding to the data voltage Vdata supplied from the signal line 620, that is, the drain current corresponding to the voltage held by the capacitor 613 (Vdata−VR) to the organic EL element 625. The driving transistor 624 is composed of, for example, a p-type thin-film transistor (p-type TFT).

The organic EL element 625 is a light-emitting element having a cathode connected to the source of the driving transistor 624 and an anode connected to the negative power source line 622, and emits light by a flow of drain current from the driving transistor 624.

The switching transistor 616 is the third switching transistor having a gate connected to the control line 619, one of the source and the drain connected to the drain of the driving transistor 624, and the other of the source and the drain connected to the positive power source line 621. The switching transistor 616 is provided between the cathode of the organic EL element 625 and the positive power source line 621, connected in series with the driving transistor 624, and is capable of determining on and off of the drain current in the driving transistor 624. The driving transistor 616 is composed of an n-type thin-film transistor (n-type TFT), for example.

With the circuit configuration described above, upon blocking the current flow between the positive power source line 621 and the signal line 620 through the source of driving transistor 624 and the switching transistor 611 by the switching transistor 616, the capacitor 613 can hold the voltage of a desired potential difference. With this, it is possible to prevent the change in the potential difference between the terminals of the switching transistor 611 due to the current flowing between the positive power source line 621 and the signal line 620 through the source of the driving transistor 624 and the switching transistor 611. Accordingly, the potential difference between the ends of the switching transistor 611 is stabilized, which allows the capacitor 613 to hold the voltage accurately corresponding to the voltage in the predetermined potential difference from the signal line 620 through the switching transistor 611. As a result, the potential difference between the electrodes of the capacitor 613, that is, the potential difference between the gate and the source of the driving transistor 624 is stabilized, and the drain current corresponding to the voltage of the desired potential difference flows in the organic EL element 625.

Embodiment 8

Next, the embodiment 8 in the present disclosure shall be described.

Figure 14:
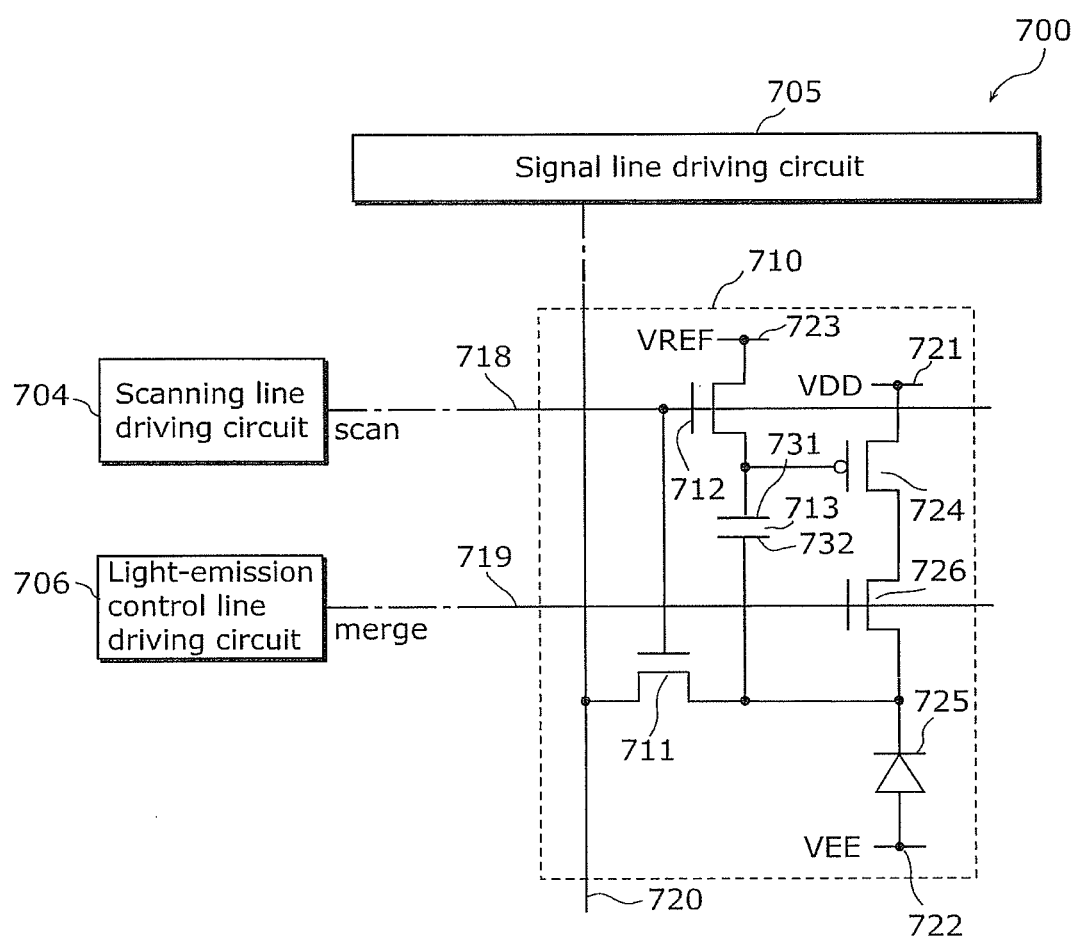
FIG. 14 illustrates a configuration of a circuit in a pixel and connections with peripheral circuits included in the display device according to the embodiment 8.
Figure 15:
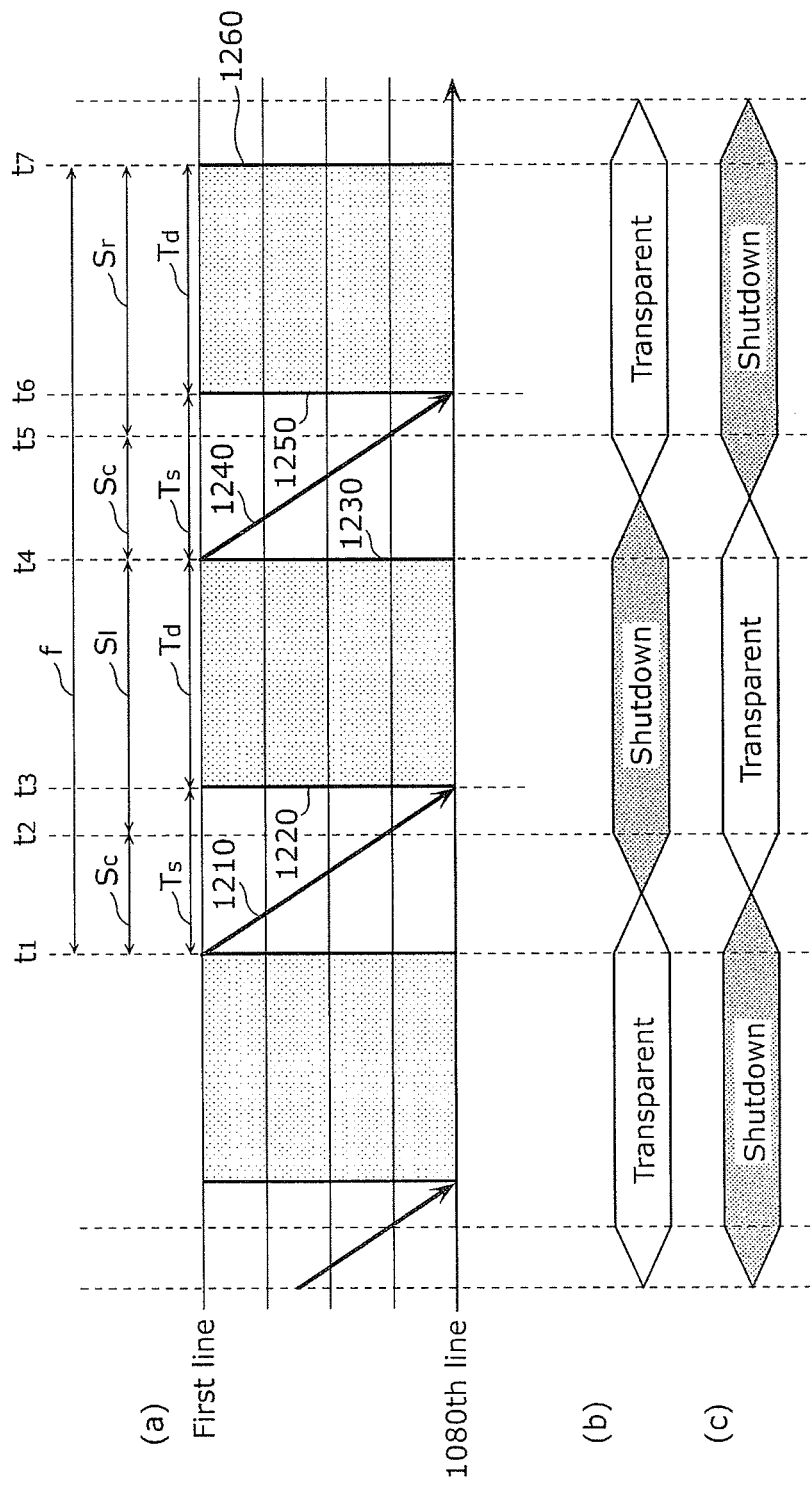
FIG. 15 is a diagram illustrating an exemplary scanning timing for displaying image in the display device according to the conventional technology.

FIG. 14 illustrates the circuit configuration of the pixel and connections with peripheral circuits in a display device according to the embodiment 4.

As illustrated in FIG. 14, a display device 700 according to the embodiment 8 includes a display unit having the multiple pixels 710. The display device 700 includes a scanning line driving circuit 704, a signal line driving circuit 705, a light-emission control line driving circuit 706, a control circuit (not illustrated) for controlling the scanning line driving circuit 704, the signal line driving circuit 705, and the light-emission control line driving circuit 706, as the peripheral circuits of the display unit. Note that, the configurations of the peripheral circuits are identical as the configurations of the peripheral circuits described in the embodiment 5. Accordingly, the description for the configurations shall be omitted.

The pixel 710 in FIG. 14 includes a switching transistor 711, switching transistors 712 and 726, a capacitor 713, a driving transistor 724, an organic EL element 725, a scanning line 718, a control line 719, a signal line 720, a positive power source line 721, a negative power source line 722, and the reference power source line 723.

The display device according to the embodiment 8 is different from the display device according to the embodiment 5 only in the circuit configuration of the pixel. More specifically, the driving transistor is of p-type, and the source of the transistor and the cathode of the organic EL element are connected. Note that the description for the display device according to the embodiment 5 shall be omitted, and only the difference shall be described.

The driving transistor 724 is a driving element having a gate connected to the electrode 731 of the capacitor 713, a drain connected to the positive power source line 721, and a source connected to one of the source and the drain of the switching transistor 726. The driving transistor 724 converts the voltage corresponding to the data voltage applied between its gate and the other of the source and the drain of the switching transistor 726 to the drain current corresponding to the data voltage. Subsequently, the drain current is supplied to the organic EL element 725 as the signal current. For example, when the switching transistor 711 and the switching transistor 712 are switched off, and the switching transistor 726 is switched on, the driving transistor 724 is capable of supplying the voltage corresponding to the data voltage Vdata supplied from the signal line 720, that is, the drain current corresponding to the voltage held by the capacitor 713 (Vdata−VR) to the organic EL element 725. The driving transistor 724 is composed of, for example, a p-type thin-film transistor (p-type TFT).

The organic EL element 725 is a light-emitting element having a cathode connected to the other of the source and the drain of the driving transistor 726 and an anode connected to the negative power source line 722, and emits light by a flow of drain current from the driving transistor 724.

The switching transistor 726 is the third switching transistor having a gate connected to the control line 719, one of the source and the drain is connected to the source of the driving transistor 724, and the other of the source and the drain connected to the cathode of the organic EL element 725. The switching transistor 726 is provided between the cathode of the organic EL element 725 and the positive power source line 721, connected in series with the driving transistor 724, and is capable of determining on and off of the drain current in the driving transistor 724. The driving transistor 726 is composed of an n-type thin-film transistor (n-type TFT), for example.

With the circuit configuration described above, upon blocking the current flow between the positive power source line 721 and the signal line 720 through the source of driving transistor 724 and the switching transistor 711 by the switching transistor 726, the capacitor 713 can hold the voltage of a desired potential difference. With this, it is possible to prevent the change in the potential difference between the terminals of the switching transistor 711 due to the current flowing between the positive power source line 721 and the signal line 720 through the source of the driving transistor 724 and the switching transistor 711. Accordingly, the potential difference between the ends of the switching transistor 711 is stabilized, which allows the capacitor 713 to hold the voltage accurately corresponding to the voltage in the predetermined potential difference from the signal line 720 through the switching transistor 711. As a result, the potential difference between the electrodes of the capacitor 713, that is, the potential difference between the gate and the source of the driving transistor 724 is stabilized, and the drain current corresponding to the voltage of the desired potential difference flows in the organic EL element 725.

As described above, by configuring the display devices described in the embodiments 1 to 8, it is possible to start writing data on the quenched pixel before quenching of all of the pixels is complete, and start light emission of the pixels on which the data is written before the writing on all of the pixels is complete. With this, it is possible to secure a long light-emission period on the display unit of the display device, and can secure high display luminance without increasing the driving cycle in the stereoscopic display.

Although only some exemplary embodiments of the display device according to the present disclosure have been described in detail above, those skilled in the art will readily appreciate that many modifications are possible in the embodiments 1 to 8 without materially departing from the novel teachings and advantages of the present invention. Accordingly, all such modifications and devices incorporating the display device according to the present disclosure are intended to be included within the scope of the present disclosure.

For example, as the switching transistor, the driver transistor, and the driving transistor, an n-type transistor which is switched on when the voltage level of the gate is high. However, the same effects as in the embodiments can be achieved by a display device which includes the transistors formed by the p-type transistors which is switched on when the voltage level of the gate is low, switching the polarity of the scanning lines. Alternatively, the n-type transistor and the p-type transistor may be combined.

In addition, the cycle of the first pulse signal and the second pulse signal output from the scanning line driving circuit to the scanning line may be changed appropriately, without limited to the example described above.

Figure 16:
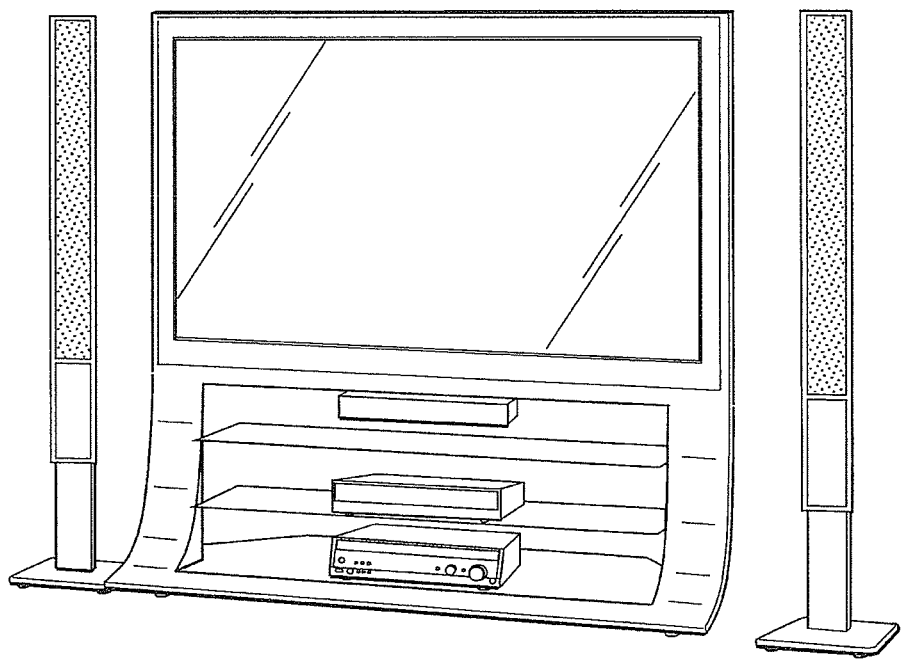
FIG. 16 is an external view of a thin flat TV in which the display device according to the embodiment is incorporated.

Furthermore, for example, the display device according to the present disclosure is incorporated in a thin flat TV illustrated in FIG. 16. By incorporating the image display device according to the embodiment, a thin flat TV capable of displaying high-definition image reflecting the video signal is implemented.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The present disclosure is particularly useful for an active-organic EL flat display panel.

The invention claimed is:

1. A display device which alternately displays a right-eye image and a left-eye image such that a user can see stereoscopic video through glasses capable of showing the right-eye image and the left-eye image sequentially, the display device comprising:
 a plurality of pixels disposed in rows and columns;
 a scanning line provided for each of the rows of the pixels;
 a control line provided for each of the rows of the pixels, the control line being separate from the scanning line
 a signal line provided for each of the columns of the pixels; and
 a driver including:
  a scanning line driver which drives the scanning line; and a signal line driver which drives the signal line, wherein the scanning line driver includes:
  a first shift register which sequentially outputs a first signal, based on a clock signal having a first cycle;
  a second shift register which sequentially outputs a second signal, based on a clock signal having a second cycle different from the first cycle; and
  a logic circuit which calculates a logical disjunction or a logical conjunction of the first signal and the second signal that are input, and outputs a scanning signal which includes a first pulse based on the first signal and a second pulse based on the second signal,
  the signal line driver outputs an image signal corresponding to the right-eye image and an image signal corresponding to the left-eye image,
  in the pixels, a quenched state, prior to light emission, sequentially starts, for each row, in the rows of the pixels, utilizing the first pulse of the scanning signal that is input through the scanning line, and light-emission data from the signal line is written on the row of the pixels, utilizing the second pulse of the same scanning signal that is input through the scanning line, the quenching and the writing of the light emission data being independent of a control signal input through the control line,
  the driver supplies the scanning signal and the image signal to the scanning line and the signal line, respectively, such that writing the light-emission data on a first row of the pixels starts before a start of the quenched state in a last row of the pixels, and
  such that writing the light-emission data on the last row of the pixels ends after a start of a light-emission state in the first row of the pixels starts, the light-emission state sequentially starts, for each row in the rows of the pixels, based on the control signal that is input through the control line.

2. The display device according to claim 1, wherein the second cycle is longer than the first cycle.

3. The display device according to claim 1, wherein each of the pixels includes at least:
 a light-emitting element;
 a first capacitor which holds a voltage;
 a driving transistor which provides the light-emitting element with flow of a drain current or source current according to the voltage held by the first capacitor, causing the light-emitting element to emit light;
 a first switching transistor which switches conduction and non-conduction between a first reference potential line which supplies a predetermined reference potential and a gate electrode of the driving transistor;
 a second switching transistor which switches conduction and non-conduction between the signal line and the first capacitor; and
 a third switching transistor which switches conduction and non-conduction between the first capacitor and a source electrode of the driving transistor,
 the display device further comprises:
 a first power source line and a second power source line for supplying power to the pixels, and
 the control line supplies the control signal to the third switching transistor.

4. The display device according to claim 3, wherein, in the pixel, one electrode of the light-emitting element is connected to the second power source line, and an other of the electrodes of the light-emitting element is connected to a source electrode of the driving transistor,
 a drain electrode of the driving transistor is connected to the first power source line,
 one electrode of the first capacitor is connected to the gate electrode of the driving transistor,
 an other electrode of the first capacitor is connected to a drain electrode or a source electrode of the second switching transistor,
 a gate electrode of the first switching transistor is connected to the scanning line,
 a gate electrode of the second switching transistor is connected to the scanning line,
 a gate electrode of the third switching transistor is connected to the control line, and
 the pixel further includes a second capacitor having one electrode connected to the one of the electrodes of the first capacitor, and the other electrode connected to a second reference potential line for supplying the predetermined reference potential.

5. The display device according to claim 4, wherein the first switching transistor and the second switching transistor are n-type thin-film transistors, and the logic circuit is a circuit which calculates the logical disjunction of the first signal and the second signal.

6. The display device according to claim 4, wherein the driver sets the first switching transistor in a conduction state by the first pulse of the scanning signal and the driving transistor in a non-conduction state by the predetermined reference potential supplied to the gate electrode of the driving transistor, such that the light-emitting element is in the quenched state,
 sets the second switching transistor in a conduction state by the second pulse of the scanning signal, such that the light-emission data from the signal line is written on the first capacitor, and
 sets the third switching transistor in a conduction state by a control signal supplied from the control line, such that a voltage corresponding to the light-emission data written on the first capacitor is applied between the gate electrode and the source electrode of the driving transistor, causing the light-emitting element to be in the light-emission state.

7. The display device according to claim 3, wherein, in the pixel, one electrode of the light-emitting element is connected to the second power source line, and an other electrode of the light-emitting element is connected to a drain electrode of the driving transistor,
 a source electrode of the driving transistor is connected to the first power source line, one electrode of the first capacitor is connected to the gate electrode of the driving transistor, an other electrode of the first capacitor is connected to a drain electrode or a source electrode of the second switching transistor, a gate electrode of the first switching transistor is connected to the scanning line, a gate electrode of the second switching transistor is connected to the scanning line, a gate electrode of the third switching transistor is connected to the control line, and the pixel further includes a second capacitor having one electrode connected to the one of the electrodes of the first capacitor, and the other electrode connected to a second reference potential line for supplying the predetermined reference potential.

8. The display device according to claim 7, wherein the first switching transistor and the second switching transistor are p-type thin-film transistors, and the logic circuit calculates the logical conjunction of the first signal and the second signal.

9. The display device according to claim 7, wherein the driver sets the first switching transistor in a conduction state by the first pulse of the scanning signal and the driving transistor in a non-conduction state by the predetermined reference potential supplied to the gate electrode of the driving transistor, such that the light-emitting element is in the quenched state, sets the second switching transistor in a conduction state by the second pulse of the scanning signal, such that the light-emission data from the signal line is written on the first capacitor, and sets the third switching transistor in a conduction state by a control signal supplied from the control line, such that a voltage corresponding to the light-emission data written on the first capacitor is applied between the gate electrode and the source electrode of the driving transistor, causing the light-emitting element to be in the light-emission state.

10. The display device according to claim 1, wherein the driver starts the light-emission state of the first row of the pixels after the start of the quenched state of the last row of the pixels.

11. The display device according to claim 1, further comprising:
a first power source line and a second power source line for supplying power to the pixels;
wherein each of the pixels includes at least:
a light-emitting element having an electrode connected to the second power source line;
a first capacitor which holds a voltage;
a driving transistor which has a drain electrode connected to the first power source line, a source electrode connected to an other electrode of the light-emitting element, and a gate electrode connected to one of electrodes of the first capacitor, and provides the light-emitting element with a flow of current according to the voltage held by the first capacitor, causing the light-emitting element to emit light;
a first switching transistor which switches conduction and non-conduction between a first reference potential line which supplies a predetermined reference potential and the gate electrode of the driving transistor;
a second switching transistor that has a drain electrode and a source electrode, one of which is connected to the other of the electrodes of the first capacitor, and that switches conduction and non-conduction between the signal line and the first capacitor;
a third switching transistor which switches conduction and non-conduction between the first capacitor and the source electrode of the driving transistor; and
a second capacitor having one electrode connected to the one of the electrodes of the first capacitor, and an other electrode connected to a second reference potential line for supplying the predetermined reference potential, a gate electrode of the first switching transistor and a gate electrode of the second switching transistor are connected to a same scanning line which is the scanning line, a gate electrode of the third switching transistor is connected to the control line, and the driver sets the first switching transistor in a conduction state by the first pulse of the scanning signal and the driving transistor in a non-conduction state by the predetermined reference potential supplied to the gate electrode of the driving transistor, such that the light-emitting element is in the quenched state, sets the second switching transistor in a conduction state by the second pulse of the scanning signal, such that the light-emission data from the signal line is written on the first capacitor, and sets the third switching transistor in a conduction state by a control signal supplied from the control line, such that a voltage corresponding to the light-emission data written on the first capacitor is applied between the gate electrode and the source electrode of the driving transistor, causing the light-emitting element to be in the light-emission state.

\* \* \* \* \*